United States Patent
Burnett, III et al.

(10) Patent No.: US 10,573,056 B2
(45) Date of Patent: Feb. 25, 2020

(54) MULTI-VIEW PROCESSING UNIT SYSTEMS AND METHODS

(71) Applicant: 3D Patents, LLC, Mission Hills, KS (US)

(72) Inventors: Thomas Lawrence Burnett, III, Austin, TX (US); Kendall Heath James, Austin, TX (US); Ronald Craig Larcom, Cedar Park, TX (US)

(73) Assignee: 3D PATENTS, LLC, Mission Hills, KS (US)

( * ) Notice: Subject to any disclaimer, the term of this patent is extended or adjusted under 35 U.S.C. 154(b) by 0 days.

(21) Appl. No.: 15/913,529

(22) Filed: Mar. 6, 2018

(65) Prior Publication Data
US 2018/0253884 A1  Sep. 6, 2018

Related U.S. Application Data

(60) Provisional application No. 62/467,718, filed on Mar. 6, 2017.

(51) Int. Cl.
*G06T 15/00* (2011.01)
*H04N 13/351* (2018.01)
*H04N 13/398* (2018.01)

(52) U.S. Cl.
CPC ......... *G06T 15/005* (2013.01); *H04N 13/351* (2018.05); *H04N 13/398* (2018.05); *G06T 2200/04* (2013.01)

(58) Field of Classification Search
None
See application file for complete search history.

(56) References Cited

U.S. PATENT DOCUMENTS

| 6,088,140 A | 6/2000 | Klug et al. |
| 6,266,167 B1 | 7/2001 | Klug et al. |
| 6,268,942 B1 | 7/2001 | Ferdman et al. |
| 6,323,971 B1 | 11/2001 | Klug |

(Continued)

FOREIGN PATENT DOCUMENTS

| JP | 4344612 B2 | 7/2009 |
| JP | 2009530661 A | 8/2009 |

(Continued)

OTHER PUBLICATIONS

Quentmeyer, Tyeler. Delivering real-time holographic video content with off-the-shelf PC hardware. Diss. Massachusetts Institute of Technology, 2004.*

(Continued)

*Primary Examiner* — Ryan M Gray
(74) *Attorney, Agent, or Firm* — Sprinkle IP Law Group

(57) ABSTRACT

A system comprising a multi-view processing unit to provide a plurality of parallel rendering pipelines to render multiple views of a scene in parallel to render targets. The multi-view processing unit comprises a multi-view processing unit memory storing a plurality of viewpoints and a multi-view processing unit processor configured to receive a request to render a scene, load the plurality of viewpoints and implement the parallel rendering pipelines to render the scene based on the plurality of viewpoints, the plurality of parallel rendering pipeline configured to render, in parallel, image data for multiple views to a set of buffers.

22 Claims, 18 Drawing Sheets

(56) References Cited

U.S. PATENT DOCUMENTS

| | | |
|---|---|---|
| 6,330,088 B1 | 12/2001 | Klug et al. |
| 6,366,370 B1 | 4/2002 | Holzbach et al. |
| 6,369,920 B1 | 4/2002 | Klug |
| 6,407,832 B1 | 6/2002 | Holzbach et al. |
| 6,407,833 B2 | 6/2002 | Klug et al. |
| 6,631,016 B1 | 10/2003 | Klug et al. |
| 6,661,548 B2 | 12/2003 | Klug et al. |
| 6,665,100 B1 | 12/2003 | Klug et al. |
| 6,710,900 B1 | 3/2004 | Klug et al. |
| 6,795,241 B1 | 9/2004 | Holzbach |
| 6,806,982 B2 | 10/2004 | Newsanger et al. |
| 6,859,293 B2 | 2/2005 | Klug et al. |
| 6,868,177 B1 | 3/2005 | Camahort et al. |
| 6,963,431 B2 | 11/2005 | Holzbach et al. |
| 7,027,197 B2 | 4/2006 | Newsanger et al. |
| 7,043,073 B1 | 5/2006 | Holzbach et al. |
| 7,190,496 B2 | 3/2007 | Klug et al. |
| 7,245,408 B1 | 7/2007 | Huang et al. |
| 7,436,537 B2 | 10/2008 | Holzbach et al. |
| 7,505,186 B2 | 3/2009 | Newsanger et al. |
| 7,558,421 B1 | 7/2009 | Holzbach |
| 7,813,018 B2 | 10/2010 | Klug et al. |
| 8,068,264 B2 | 11/2011 | Klug et al. |
| 8,125,698 B2 | 2/2012 | Huang et al. |
| 8,233,206 B2 | 7/2012 | Kramer et al. |
| 8,564,865 B2 | 10/2013 | Klug et al. |
| 8,605,081 B2 | 12/2013 | Holler et al. |
| 8,665,505 B2 | 3/2014 | Newsanger et al. |
| 8,736,675 B1 | 5/2014 | Holzbach et al. |
| 9,843,790 B2 | 12/2017 | Lucente |
| 10,412,363 B1 | 9/2019 | Burnett, III et al. |
| 2008/0144174 A1 | 6/2008 | Lucente et al. |
| 2010/0156894 A1* | 6/2010 | Holler .................... G03H 1/08 345/419 |
| 2010/0220098 A1* | 9/2010 | Holler .................... G03H 1/08 345/419 |
| 2010/0231586 A1* | 9/2010 | Weiblen ............... G06T 15/20 345/420 |
| 2011/0012895 A1* | 1/2011 | Lucente ................. G03H 1/08 345/419 |
| 2012/0092232 A1* | 4/2012 | Burnett ................ G06F 3/1438 345/1.1 |
| 2012/0287490 A1* | 11/2012 | Klug .................... G03H 1/0841 359/9 |
| 2014/0168213 A1* | 6/2014 | Rice ..................... G03H 1/0808 345/420 |
| 2016/0132021 A1* | 5/2016 | Zschau ................ G03H 1/0808 359/9 |
| 2017/0038728 A1* | 2/2017 | Zschau ................ G03H 1/0808 |

FOREIGN PATENT DOCUMENTS

| | | |
|---|---|---|
| JP | 5528340 B2 | 4/2014 |
| WO | WO 2008048360 A2 | 4/2008 |

OTHER PUBLICATIONS

Dreshaj, Ermal. Holosuite: an exploration into interactive holographic telepresence. Diss. Massachusetts Institute of Technology, 2015.*

Yaraş, Fahri, Hoonjong Kang, and Levent Onural. "State of the art in holographic displays: a survey." Journal of display technology 6.10 (2010): 443-454.*

Hogel Processing Unit, Wikipedia, last modified Jun. 10, 2016, retrieved Mar. 5, 2018, 3 pages, from https://en.wikipedia.org/w/index.php?title=Hogel_processing_unit&oldid=724556343.

Levoy, M. and Hanrahan, P., "Light Field Rendering," in Proceedings of SIGGRAPH '96, New Orleans, La., Aug. 4-9, 1996, and in Computer Graphics Proceedings, Annual Conference Series, pp. 31-42, ACM SIGGRAPH, 1996.

Halle, Michael and Kropp, Adam, "Fast Computer Graphics Rendering for Full Parallax Spatial Displays," Proc. Soc. Photo-Opt. Instrum. Eng. (SPIE), 3011:105-112, Feb. 10-11, 1997, 8 pgs.

Johnson, Tyler, et al., "Multi-Projector Image Correction on the GPU," Workshop on Edge Computing Using New Commodity Architectures, 2006, 2 pgs.

Phong, Bui Tuong, "Illumination for Computer Generated Graphics," Communications of the ACM, vol. 18, No. 6, Association of Computing Machinery, Inc., Jun. 1975, 7 pgs.

* cited by examiner

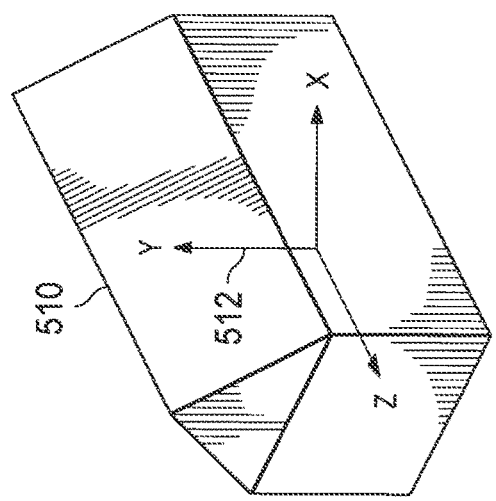
FIG. 5B
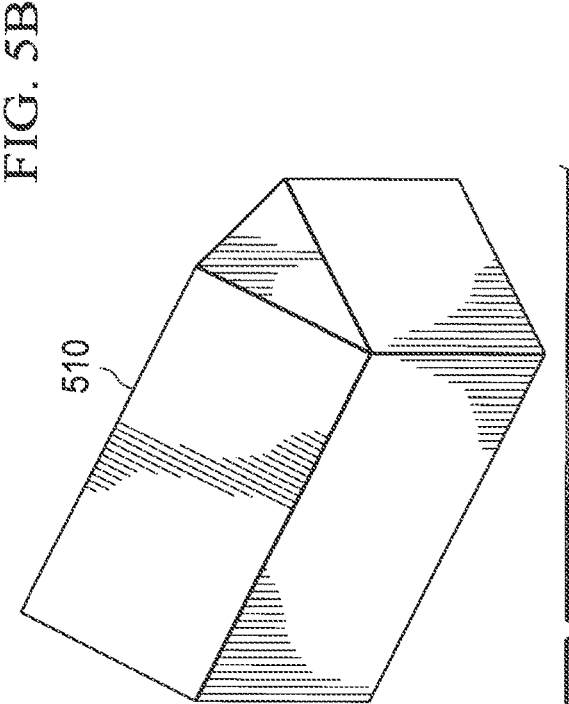
FIG. 5C
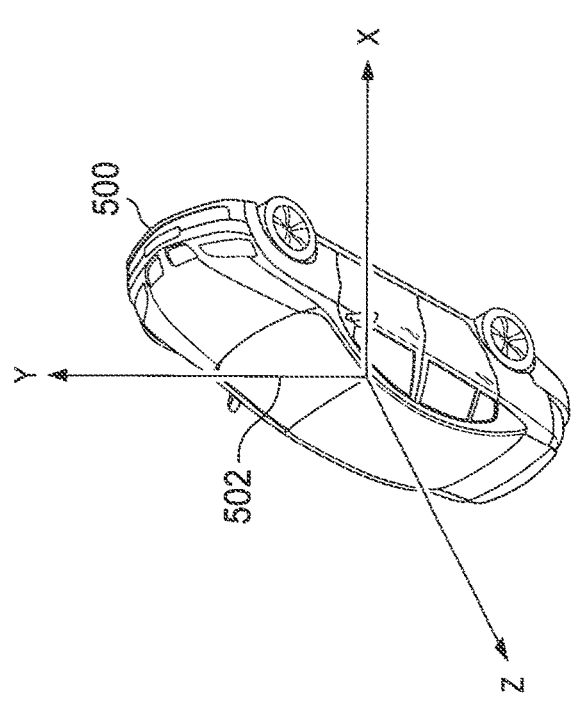
FIG. 5A
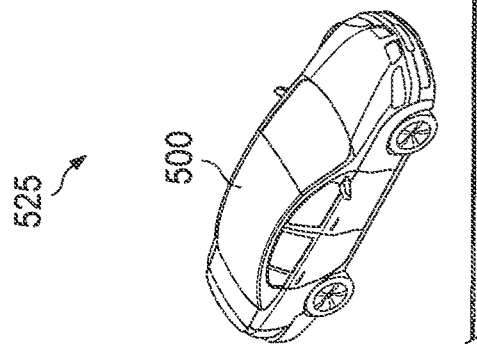

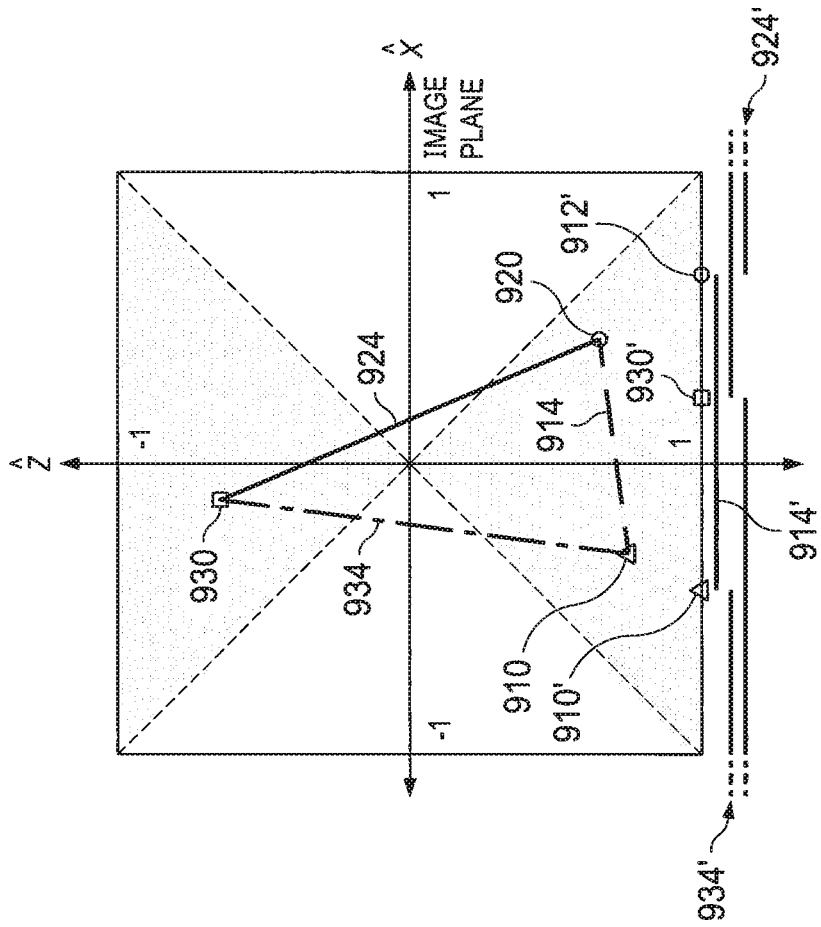
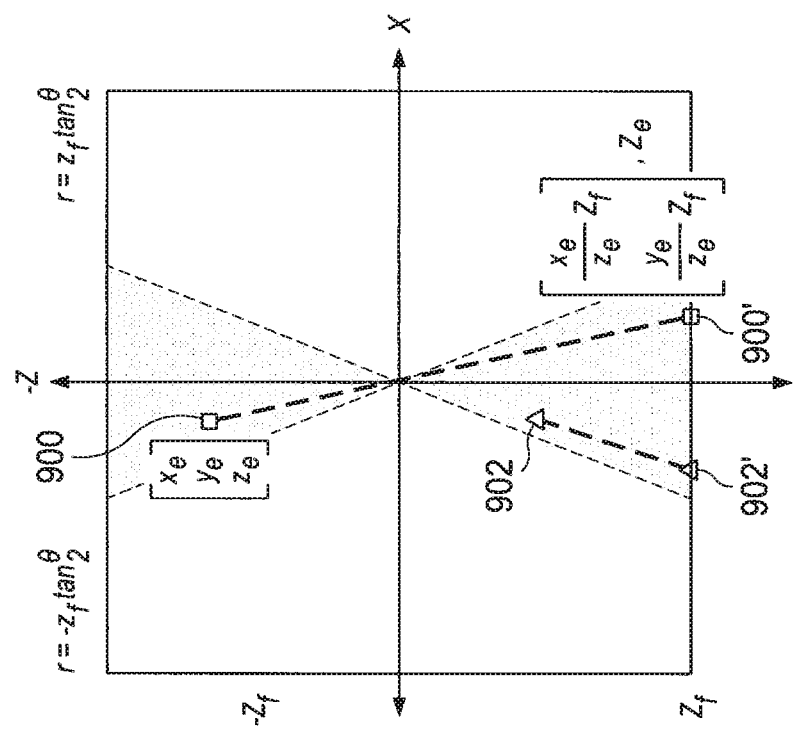
FIG. 9B
FIG. 9A

MULTI-VIEW PROCESSING UNIT SYSTEMS AND METHODS

RELATED APPLICATIONS

This application claims the benefit of priority under 35 U.S.C. § 119(e) to U.S. Provisional Patent Application No. 62/467,718, filed Mar. 6, 2017, entitled "Multi-View Processing Unit," by Thomas Burnett et al., which is hereby fully incorporated by reference herein.

GOVERNMENT LICENSE RIGHTS

This invention was made with government support under Contract N0017817C1100 awarded by Naval Surface Warfare Center Dahlgren. The government has certain rights in the invention.

TECHNICAL FIELD

The present disclosure relates generally to computer graphics. More particularly, the present disclosure relates to systems and methods for generating multiple views of a scene.

BACKGROUND

Three-dimensional (3D) displays simultaneously generate multiple views per update of the display to create a 3D effect when viewed by the human visual system. Current consumer-grade augmented reality (AR)/virtual reality (VR) headsets, for example, typically generate two views, one for each eye, though more advanced AR/VR headsets may generate more views. Other examples of multi-view displays include, but are not limited to lenticular, multi-depth plane, volumetric and light-field displays.

A graphical display can be termed autostereoscopic when the work of stereo separation is done by the display so that the observer need not wear special eyewear to perceive the 3D effect. Light-field autostereoscopic 3D displays, for example, create the 3D hologram by presenting many perspective correct views simultaneously.

Examples of techniques for producing holograms can be found in U.S. Pat. No. 6,330,088, entitled "Method and apparatus for recording one-step, full-color, full-parallax, holographic stereograms" and naming Michael A. Klug et al. as inventors, (the "'088 patent"). U.S. (Publication 2008/0144174), entitled "Dynamic Autostereoscopic Displays," published on Jun. 19, 2008 (the "'005 application") and U.S. Pat. No. 8,736,675, entitled "Multi-Core Processor Architecture for Active Autostereoscopic Emissive Displays," filed Dec. 3, 2007 (the "'675 patent") further describe example light-field displays that present different views from different zones of the display to generate a dynamic 3D hologram that is visible to the unaided eye. The '088 patent, '005 application and '675 patent are hereby incorporated by reference herein in their entireties.

The processing of information to display a 3D image generally requires substantial amounts of computational effort to simultaneously render multiple images. As would be appreciated by those in the art, to render an image of a 3D model/scene, geometric data such as vertex positions and normal vectors can be transformed via vertex transformations and primitive assembly operations in the graphics pipeline before rasterization. More particularly, rendering an image may comprise rendering triangles. To render a triangle, the vertices are converted by a series of linear vertex transformations from their original 3D coordinate system to a 2D location and depth in image pixels.

3D multi-view displays typically rely on GPUs to carry out the rendering operations. While GPUs are powerful and effective processors for rendering large framebuffers from a single point of view, they suffer shortcomings when used with multi-view displays. In particular, conventional graphics pipelines implemented by GPUs are not well suited to multi-view rendering.

This is, at least in part, because the typical GPU graphics pipeline requires a separate render pass for each viewpoint/viewport required for the display system. Consequently, the host application or display render system providing 3D scene data to the GPU must repeatedly dispatch the scene to the GPU with a new viewpoint and viewport for each viewpoint/viewport change.

For example, to display a 3D image on a light-field display, a host application or light-field display render system may have to dispatch a scene to the GPU with a new viewpoint and viewport for each active hogel for which the GPU renders. The GPU, using a typical GPU graphics pipeline, will rasterize the scene for one hogel at a time, despite the fact that only the viewpoint and viewport change and not the scene description. Multi-view rendering on a GPU in this manner becomes a highly serial process by which vertex draw calls from the render engine and the resulting dispatch/transforms required per rendered view dominates the render pipeline.

Another issue with prior multi-view systems is that the host application and or render engine must know how many views a particular display supports in order to dispatch the correct viewpoints and viewports and to properly allocate viewports in the frame buffer. As such, the host and/or render engine will require new drivers to support each different type of display.

Moreover, displays that perform multi-view rendering often require much more time to complete a display frame than the host application. This requires that the host application stall and synchronize with the rendering system. Often this situation reduces the frame rate of the host application and sacrifices host application interactivity.

Multi-viewpoint rendering becomes a responsibility of the host application which must cache the render commands and then re-render the list for each viewpoint. Therefore, the host application must understand the exact nature of every view rendered for the display as well as any distortion corrections for any display specific optical properties.

SUMMARY

Embodiments described herein provide multi-view rendering systems, multi-view processing units, multi-view processing unit controllers, display devices and related methods. One embodiment includes a system comprising a multi-view processing unit to provide a plurality of parallel rendering pipelines to render multiple views of a scene in parallel to a set of render targets in an optical display. The multi-view processing unit comprises a multi-view processing unit memory storing a plurality of viewpoints and a multi-view processing unit processor configured to receive a request to render a scene, load the plurality of viewpoints and implement the parallel rendering pipelines to render the scene based on the plurality of viewpoints, the plurality of parallel rendering pipelines configured to render, in parallel, image data for multiple views to the plurality of render targets.

By way of example, but not limitation, the render targets may include viewports in frame buffers, locations in a data list (e.g., a tagged location) or other render target. In one embodiment, the render targets correspond to hogels.

According to one embodiment, the parallel rendering pipelines render directly into a set of display buffers for photonics of the optical display. In another embodiment, the multi-view processing unit is configured to render the image data to a local buffer and transfer the image data from the local buffer to a display buffer.

The multi-view processing system can be configured to assign a different one of the plurality of viewpoints and a different one of render targets to each of the plurality of parallel render pipelines. The multi-view processing unit can be configured to dispatch the same set of geometry data to each of the plurality of rendering pipelines.

Each of the plurality of rendering pipelines can be configured to transform geometry from model space to a viewpoint specific eye space corresponding to the different one of the plurality of viewpoints assigned to that render pipeline. Each parallel rendering pipeline can be configured to render multiple sides of bowtie frustum in a single pass.

A multi-view rendering system may comprise a plurality of multi-view processing units and an associated multi-view processing unit controller to dispatch geometry data and render lists to the multi-view processing units. According to one embodiment, the multi-view processing unit controller is configured to triple buffer render lists for dispatch to the multi-view processing unit.

The multi-view processing unit controller can be configured to generate a synchronization signal to the multi-view processing units to synchronize display of the multiple views. The multi-view processing unit controller can be further configured to halt dispatch of the next scene frame to the multi-view processing unit until a synchronization signal is received from the multi-view processing unit.

The multi-view rendering system may include a geometry cache and a plurality of render list buffers.

Another embodiment can comprise a method includes receiving, at a multi-view processing unit, a request to render a view of a scene, the scene comprising geometry data, the multi-view processing unit storing a plurality of viewpoints; dispatching the scene to a plurality of parallel rendering pipelines, each pipeline assigned a different viewpoint from the plurality of viewpoints and configured to render image data based on the viewpoint assigned to that pipeline; and rendering in parallel, by the plurality of parallel rendering pipelines, image data for multiple views to the set of render targets.

By way of example, but not limitation, the render targets may include viewports in frame buffers, locations in a data list (e.g., a tagged location) or other render target. In one embodiment, the render targets correspond to hogels.

Rendering may comprise rendering directly into a set of display buffers for photonics of an optical display. In another embodiment, rendering comprise rendering the image data to a local buffer. The method may further include transferring the image data from the local buffer to a display buffer.

A method for multi-view rendering may include assigning a different one of the plurality of viewpoints and a different one of the set of render targets to each of the plurality of parallel render pipelines. A method of multi-view rendering may include dispatching the same set of geometry data to each of the plurality of rendering pipelines in parallel.

According to one embodiment, a method for multi-view rendering includes performing in each of the plurality of parallel rendering pipelines, a model space to viewpoint specific eye space transform on a set of geometry data using the viewpoint assigned to that rendering pipeline.

A method for multi-view rendering may comprise a multi-view processing unit controller dispatching geometry data and render lists a multi-view processing unit. The multi-view processing unit, according to one embodiment, triple buffers render lists at the multi-view processing unit controller for dispatch to the multi-view processing unit.

A method for multi-view rendering may include determining by the multi-view processing unit that the set of buffers are in a swap state and, based on the determination, sending a synchronization signal to the multi-view processing unit controller.

According to one embodiment a method for multi-view rendering comprises halting dispatching by the multi-view processing unit controller of a next scene frame to the multi-view processing unit until a synchronization signal is received from each multi-view processing unit coupled multi-view processing unit controller.

A method for multi-view rendering may comprise rendering multiple sides of bowtie frustum in a single pass.

Some embodiments may be implemented as a computer program product comprising processor executable instructions embodied on a non-transitory computer readable medium.

BRIEF DESCRIPTION OF THE DRAWINGS

The subject matter of the present application may be better understood, and the numerous objects, features, and advantages made apparent to those skilled in the art, by referencing the accompanying drawings.

FIG. 5A illustrates one example of model space and FIG. 5B illustrates a second example of model space.

FIG. 5C is a diagrammatic representation of one embodiment of world space.

FIG. 9A and FIG. 9B illustrate projecting points onto a frustum.

DETAILED DESCRIPTION

Figure 1:
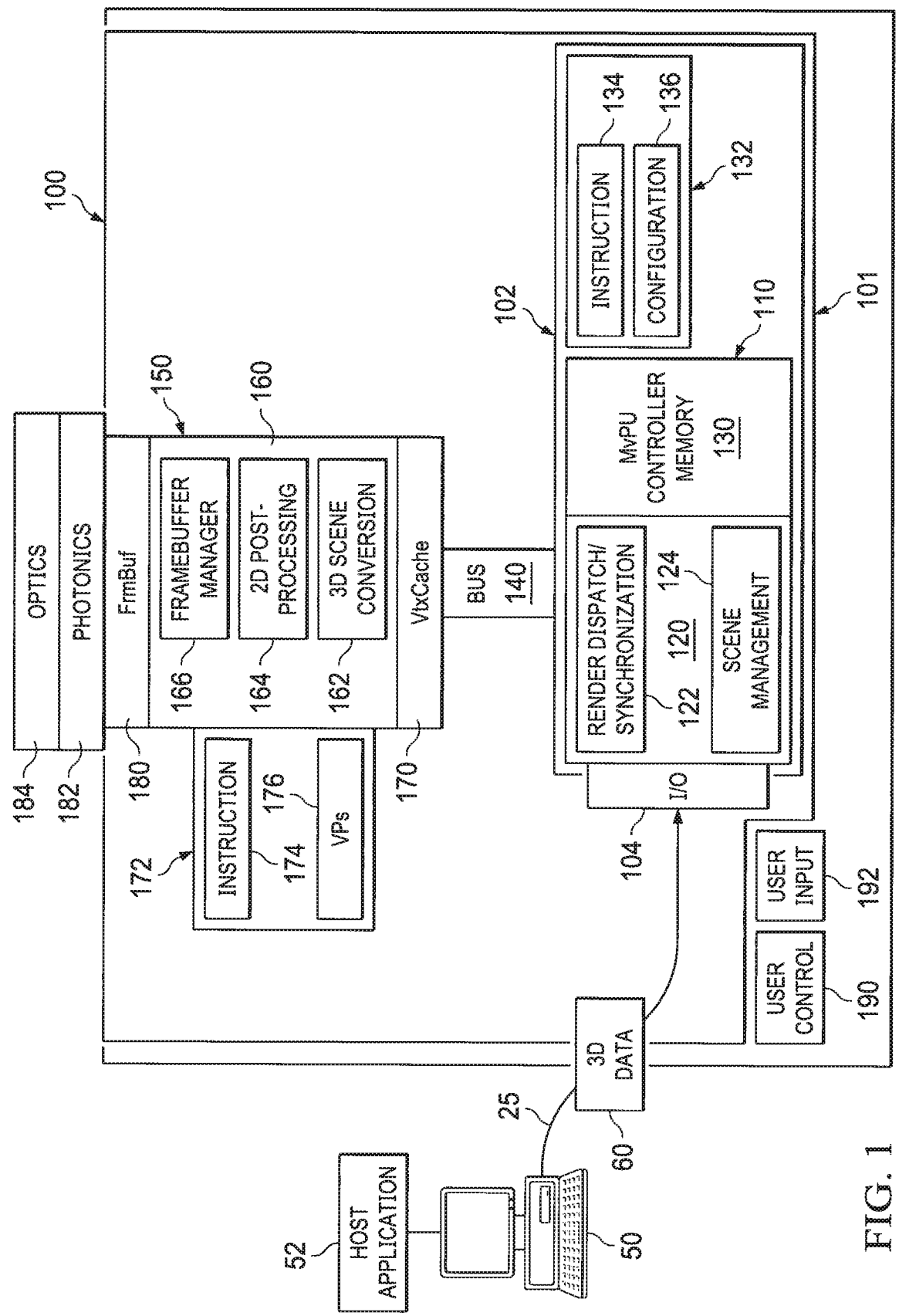
FIG. 1 is a block diagram representation of one embodiment of a multi-view display architecture.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

According to one aspect of the present disclosure, embodiments of a multi-view processing units (MvPU) architecture and techniques for implementing multi-view rendering and displays are disclosed. At a high level, an MvPU implements parallel render pipelines to render multiple views of a scene in parallel. An MvPU can maintain viewpoint-specific data to reduce or eliminate the requirement for a host to re-dispatch geometry per rendered view, thus reducing dispatch duplication. The MvPU architecture may also include a controller to efficiently distribute scene data to one or more MvPUs. Furthermore, techniques are provided to enable an MvPU (or other renderer) to render both sides of an image plane in a single pass of the geometry, making processing more efficient.

According to another aspect of the present disclosure, a multi-view display system is provided. The multi-view display system can include a multi-view rendering system (an MvPU system) that processes 3D data to render an image (pixel data) from the 3D data, photonics to convert the rendered image into light and optics to distribute, filter, condition or otherwise control the generated light. The multi-view rendering system comprises an MvPU controller subsystem that distributes 3D data to one or more MvPUs that each render multiple views in parallel. The views may be rendered into specified render targets, for example display buffers used by the photonics of the display. Thus, the photonics can generate light for multiple views simultaneously, creating a 3D effect when viewed by the human visual system.

The MvPUs may be separated from the host CPU (or GPU) by an expandable, interconnect framework. The MvPUs can be physically located in close proximity to the modulation layer and have direct write access to the modulation driver buffers. For example, the MvPU may have a direct interface to the display chip. This can reduce the complexity of an MvPU interconnect framework and allow the viewpoint specific processing pipeline to be as short and efficient as possible.

Each MvPU can comprise an independent processor, requiring minimal support logic and interconnect to a host CPU. The MvPU interconnect framework can provide scene, command and sync buffering and relay throughout the topology. MvPUs can operate near the modulation framebuffers of the photonics subsystem reducing the need to compress/transfer/decompress pixels from the render source to the destination driver over long traces/paths. In some embodiments, neither the host system nor the individual MvPUs have knowledge of the interconnect topology or even the depth and breadth of the system. To keep data distribution simple, there may be a fixed relationship between the number of MvPUs in the system and the photonics devices they service; for example one MvPU per modulator. These and other aspects of embodiments of MvPUs and display systems are discussed further below.

MvPUs may be implemented in a variety of multi-view displays, including, but not limited to, virtual and augmented reality headsets, volumetric, light-field displays and other displays.

FIG. 1 is a block diagram representation of one embodiment of a multi-view display architecture comprising a multi-view display system 100, such as an AR/VR headset, light-field display or other type of multi-view display, coupled to a source of 3D data 60.

In the embodiment illustrated, 3D data 60 input to the display system 100 is sourced from a 3D application 52 hosted on an external host computer 50. The 3D application 52 can be responsible for fusing the appropriate 2D and 3D data sources to construct a 3D scene which is then streamed to the display system 100 via a communication channel 25 having sufficient bandwidth to support display system 100. Examples of communications channels include, but are not limited to a network channel, a USB channel or other bus, or other channel.

Display system 100 includes a multi-view rendering system 101 that renders, in parallel, multiple views of a 3D model/scene described by 3D data 60. Multi-view rendering system 101 comprises an MvPU control subsystem 102 coupled to MvPU 150 by a bus 140 or other interconnect. The MvPU control subsystem and MvPU 150 may be addressable on the interconnect. MvPU control subsystem 102 includes or is connected to an I/O interface 104 that is configured to connect to and interface with communication channel 25 to receive 3D data 60 from the data source. MvPU controller 110 distributes 3D data 60 (in some cases manipulated or transformed by MvPU controller 110) to MvPU 150, which converts 3D data 60 into viewpoint specific images (viewpoint specific pixel data).

Photonics 182 convert the image pixel data rendered by MvPUs 150 into light-rays/photons that are projected through optics 184. Photonics 182 can comprise numerous different types of emissive or non-emissive displays. Emissive displays generally refer to a broad category of display technologies which generate their own light, including: electroluminescent displays, field emission displays, plasma displays, vacuum fluorescent displays, carbon-nanotube displays, and polymeric displays such as organic light emitting diode (OLED) displays. In contrast, non-emissive displays require an external source of light (such as the backlight of a liquid crystal display). Optics 184 can comprise a number of optical elements, such as light guides, lenses and other optical elements to distribute light to a viewer.

In general, photonics 182 and optics 184 can form multiple micro-projectors, each micro-projector projecting a viewpoint specific image. The superposition of the viewpoint specific images can create a 3D effect when viewed by the human visual system. As would be appreciated by the skilled artisan, the photonics 182 and optics 184 depend on the type of display device for which multi-view rendering system 101 is implemented. For example, photonics 182 and optics 184 may comprise photonics and optics of a AR/VR headset. As another example, photonics 182 and optics 184 may form an array of holographic elements (hogels) of a light-field display.

As discussed above, MvPU 150 renders multiple viewpoint specific images for projection by photonics 182 and, more particularly, renders multiple viewpoint specific images in parallel for projection using data for a three-dimensional scene as specified by 3D data 60. Depending on the complexity of the source data, the micro-projectors, the desired level of dynamic display, and the level of interaction with the display, various different image rendering techniques can be used. Images can be rendered in real-time (or near-real-time), pre-rendered for later display, or some combination of the two. For example, certain portions of photonics 182 can utilize real-time image rendering (providing maximum display updateability), while other portions of use pre-rendered view-point specific images. A pre-rendered image and real-time image may be combined into a single image for projection. As an example, a pre-rendered background image and a real time foreground image may be combined as discussed below.

In general, the multi-view rendering system 101 can be configured to process 3D data 60 in the form of geometry and command data and create viewpoint specific image output data in response. A software display driver at host 50 can allow the host application 52 to communicate with the control subsystem 102, which can then relay the appropriate data and signals to the MvPU 150.

According to one embodiment, host application 52 provides 3D scenes to display system 100. For each scene, the host computer 50 may provide a scene description and a view volume of the scene that should be rendered. Scene data may include data for one or more 3D models, such as, for example, geometry (e.g., vertex lists), texture, lighting, shading, bounding volumes (e.g., sphere or cuboid) and other information as a description of the virtual scene.

MvPU controller 110 distributes render content and manages synchronization when there are multiple MvPUs. MvPU controller 110 can be configured to cache, dispatch and synchronize rendering of the scene by MvPU 150. MvPU 150 uses the scene data dispatched by the controller 110 to render multiple views of the scene in parallel so that the host system 50 is not burdened with multi-view rendering tasks. Thus, according to one embodiment, host application 52 can dispatch the geometry for a scene frame once to MvPU controller 110 and MvPU 150 can render all the appropriate views, preferably without further involvement from the host for that scene frame.

MvPU controller 110 comprises MvPU control processor 120, MvPU controller memory 130 and MvPU controller storage 132, which may be on-chip or other memory. MvPU control processor 120 includes a render dispatch/synchronization processor 122 that manages dispatching render content to MvPU 150 and scene buffer and management processor 124 that manages buffers in MvPU controller 110.

In one embodiment, MvPU controller 110 can be embodied on a single chip or multiple chips. For example, one or more of I/O 104, render dispatch/synchronization processor 122, scene buffer and management processor 124, MvPU controller memory 130 and or MvPU controller storage 132 may be implemented as an ASIC/chip specifically designed to buffer render content, dispatch render content to MvPUs 150 and/or synchronize MvPU 150. In other embodiments, an MvPU controller 110 may be implemented as a programmable processor programmed to implement render dispatch/synchronization processor 122 and/or scene buffer and management processor 124. According to one embodiment, MvPU control processor 120 may comprise a programmable processor that executes a set of computer readable instructions 134 stored on a non-transitory computer readable medium (e.g., 134). MvPU controller storage 132 may further include controller configuration data 136 to configure MvPU controller storage 132 and/or MvPU 150.

MvPU 150 may be connected to MvPU controller 110 by bus 140, for example an expandable broadcast bus, or other interconnect. In accordance with one embodiment, MvPU 150 is a highly parallel homogeneous computation device dedicated to rendering multiple views for display system 100. MvPU 150 comprises an MvPU processor 160, MvPU cache 170 and MvPU storage 172. MvPU Processor 160 comprises a 3D scene conversion processor 162, 2D post processing processor 164 and framebuffer manager 166 that implement parallel graphics pipelines that render multiple views of a scene in parallel. Each pipeline may apply corresponding viewpoint specific data 176 stored, for example, in MvPU storage 172. As discussed further below, viewpoint specific data 176 may include data a viewpoint specific transform or data from which the viewpoint-specific transform can be derived. Each pipeline may also be configured with a designated render target.

According to on embodiment, 3D conversion processor 162 provides a vertex processor, rasterizer, fragment processor and layer/output merging to convert 3D geometry data to 2D images. 2D post processing processor 164 can apply 2D color and spatial corrections. Framebuffer manager 166 manages writing data to render targets, such as viewports in one or more frame buffers 180 of photonics 182. MvPU 150 can include a vertex/texture cache 170 to reduce expensive memory requests and arbitration with the memory of controller 110.

In one embodiment, MvPU 150 can be embodied on a single chip or multiple programmable chips. For example, an MvPU 150, including 3D conversion processor 162, 2D post processing processor 164, framebuffer manager 166, MvPU cache 170 and/or MvPU storage 172 may be implemented as an Application Specific Integrated Circuit (ASIC/chip) specifically designed to render 2D images for multiple views of a scene with minimum host side support. In other embodiments, an MvPU 150 may comprise a programmable processor programmed to implement 3D conversion processor 162, 2D post processing 164 and framebuffer management 166. MvPU processor 160, for example, may comprise a programmable processor that executes a set of computer readable instructions 174 stored on a non-transitory computer readable medium (e.g., MvPU storage 172).

While, in the foregoing examples, MvPU controller 110 and interface 104 is illustrated as a separate from the MvPU 150, one or more MvPUs 150 may include an integrated controller 110 or interface 104.

Display system 100 includes user control software and/or hardware (user display control 190). This control can provide users with overall system control including sub-system control as necessary. Control 190 can be used to adjust basic display parameters including brightness, color, refresh rate, and the like, initiate calibration routines or take other actions. As with many of the elements illustrated in FIG. 1, user control 190 can be integrated with other system elements, or operate as a separate sub-system. Numerous variations will be apparent to those skilled in the art.

A user may interact with a scene through various user input devices 192. For example, in an AR/VR headset, user input device 192 may include accelerometers to sense movement of the user's head. According to one embodiment, the host application 52 can be responsible for registering, tracking, and responding to input device actions. In another embodiment, a user input device may be configured to output a view volume transform (e.g., a view volume transform matrix) that can be processed by multi-view rendering system 101 to change the rendered views.

Figure 2:
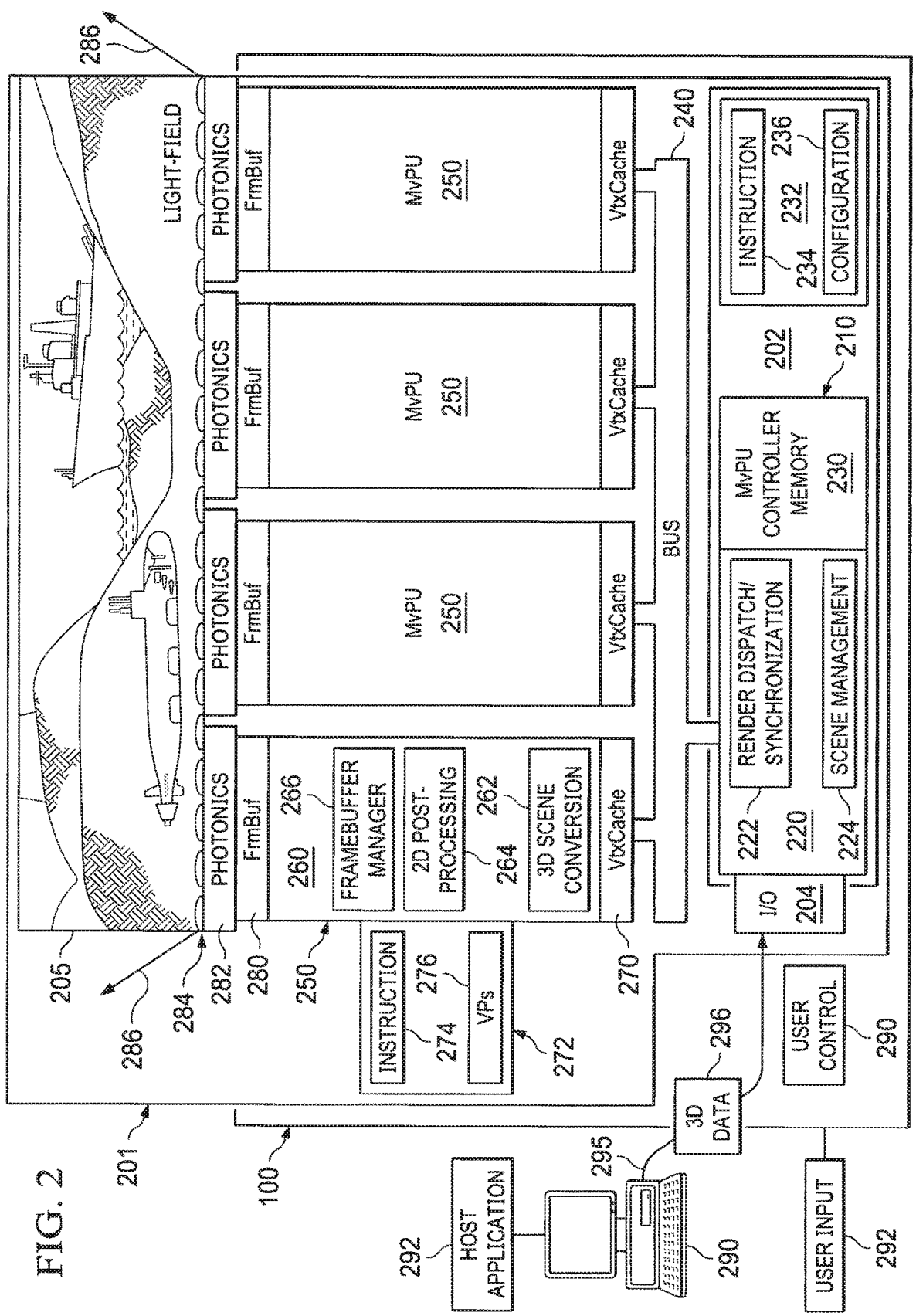
FIG. 2 is a block diagram representation of one embodiment of a display architecture comprising an autostereoscopic light-field display system.

As discussed above, a multi-view rendering system, such as multi-view rendering system 101, can be implemented to render images for a variety of display types. FIG. 2 is a block diagram representation of one embodiment of a display architecture comprising an autostereoscopic light-field display system 200 comprising a multi-view rendering system 201. In the embodiment illustrated, 3D data 296 input to the display system 200 is sourced from a 3D application 292 hosted on an external host computer 290. The 3D application 292 can be responsible for fusing the appropriate 2D and 3D data sources to construct a 3D scene which is then streamed to the display system 200 via a communication channel 295 having sufficient bandwidth to support display system 200. Examples of communications channels include, but are not limited to a network channel, a USB channel or other bus, or other channel.

Display system includes a multi-view rendering system 201 that comprises an MvPU control subsystem 202 coupled to MvPUs 250 by a bus 240 or other interconnect. The MvPU control subsystem 202 and MvPUs 250 may be addressable on the interconnect. The multi-view rendering system 201 converts 3D data 296 into a light-field radiance image. MvPU control subsystem 202 is coupled to or includes an I/O interface 204 that is configured to connect to and interface with communication channel 295 to receive 3D data 296 from the data source. MvPU controller 210 distributes 3D data 296 (in some cases manipulated or transformed by MvPU controller 210) to MvPUs 250, which render multiple views of a scene in parallel.

Photonics 182 convert the radiance image pixel data rendered by MvPUs 250 into light-rays/photons that are projected through optics 284. Light-field display system 100 projects synthetically rendered light rays with depth and color to produce a dynamic autostereoscopic image, illustrated by display volume 205.

Photonics 282 and optics 284 can form an array of holographic elements (hogels), each hogel comprising a micro-projector configured to radiate light in a plurality of directions, with controllable intensities in each of the plurality of directions. Each hogel displays a suitably processed hogel image rendered by an MvPU 250 with each parallel hogel image representing a different view of a scene from a corresponding point spot on the holographic image plane. The superposition of projected hogel images, each emanating from a different micro-projector position, present the composite autostereoscopic image (display volume 205) to a viewer at any position within the projection.

The projection plane of display system 200 may be comprised of a single display that provides light for the array of hogels or an array of sub-displays where each sub-display provides light to some number of hogels in the array of hogels. Thus, the composite autostereoscopic image may be produced by a single display or a number of sub-displays operating in parallel as a display.

In general, photonics 282 can comprise numerous different types of emissive or non-emissive displays. In particular, photonics 282 may comprise emissive light modulators or displays to present hogel images to the optics layer 284. For example, pixel data may be converted into light by an array of spatial light modulators (SLMs). A single SLM may generate light for multiple hogels. In addition or in the alternative to emissive modulators, a number of other types of modulation devices can be used. By way of example, but not limitation, SLMs may comprise: electro-optic (e.g., liquid-crystal) transmissive displays; micro-electro-mechanical (e.g., micromirror devices, including the TI DLP) displays; electro-optic reflective (e.g., liquid crystal on silicon, (LCoS)) displays; magneto-optic displays; acousto-optic displays; and optically addressed devices.

Optics 284 can comprise a number of optical elements. According to one embodiment, optics 184 comprises relay optics that relay light to an array of micro-lenses configured to angularly distribute the radiance image light-rays to construct a full parallax 3D scene that is perspective correct for all views/viewers within the light-field display's projection frustum field of view (FOV) 286. Thus, light rays can be angularly distributed in frustum FOV 286 by a micro-lens array without regard to the number of viewers, viewer position, or viewer gaze direction.

Photonics 282 and optics 284 may be arranged as an array of display modules in which each hogel comprises a combination of a lens element optically coupled to densely packed pixels that emit light into the lens element. Examples of display modules are described in the '005 application and '675 patent, both of which are fully incorporated by reference herein for all purposes.

MvPUs 250 render a radiance image for projection by photonics 282 and, more particularly, render multiple hogel images in parallel for projection using scene data for a three-dimensional scene as specified by 3D data 296. Depending on the complexity of the source data, the particular display modules, the desired level of dynamic display, and the level of interaction with the display, various different hogel rendering techniques can be used. Hogel images can be rendered in real-time (or near-real-time), pre-rendered for later display, or some combination of the two. For example, certain display modules in the overall system or portions of the overall display volume can utilize real-time hogel rendering (providing maximum display updateability), while other display modules or portions of the image volume use pre-rendered hogel images.

The development of light field rendering techniques generally, and the application of those techniques to the field of holography have inspired the development of light field rendering as described by, for example, M. Levoy and P. Hanrahan in "Light Field Rendering," in Proceedings of SIGGRAPH'96, (New Orleans, La., Aug. 4-9, 1996), and in Computer Graphics Proceedings, Annual Conference Series, pages 31-42, ACM SIGGRAPH, 1996, which are hereby incorporated by reference herein in their entirety. The light field represents the amount of light passing through all points in 3D space along all possible directions.

A light-field can be described as a set of rays that pass through every point in space and is typically parameterized for computer vision in terms of a plenoptic function:

$$L = P(\Theta, \phi, \lambda, t, Vx, Vy, Vz)$$

where (Vx,Vy,Vz) defines a point in space, $(\Theta,\phi)$ defines the orientation or direction of a ray, A defines the wavelength, and t is the time component.

Typical light-field models implemented in computer systems represent radiance as a red, green and blue triple, and consider static time-independent light-field data only, thus reducing the dimensionality of the light-field function to five dimensions and three color components. Modeling the light-field can thus involve processing and storing a function whose support is the set of all rays in 3D Cartesian space. However, light field models in computer graphics usually restrict the support of the light-field function to four dimensional (4D) oriented line space. Two types of 4D light-field representations have been proposed, those based on planar parameterizations and those based on spherical, or isotropic, parameterizations. While examples herein are discussed primarily with respect to planar parameterizations, other embodiments may utilize spherical parameterizations.

A light-field display radiance image is a raster description of a light-field which can be projected through a micro-lens array to reconstruct a 3D image in space. The radiance image consists of a 2D array of hogel images that represent the position, direction, intensity, and color of light rays within the light-field as described by the plenoptic function above. A hogel image can represent light-rays originating on either side of an image plane. This ability allows for projected 3D light-field content to be seen on either side of the light-field display image plane, effectively doubling the projection depth.

Light-field radiance image rendering comprises rendering the perspective views present in the light-field of a scene. The synthetic light-field is rendered from the perspective of a light-field projection plane. More particularly, rendering the light-field can include rendering a unique hogel image for each hogel position and orientation based at least in part on a "world" space of the scene. Consequently, to present a 3D aerial scene, multiple 2D views of the scene are rendered.

A massively parallel active hogel display can be a challenging display from an interactive computer graphics rendering perspective. Although a lightweight dataset (e.g., geometry ranging from one to several thousand polygons) can be manipulated and multiple hogel views easily rendered at real-time rates (e.g., 10 frames per second (fps) or above), many datasets of interest are more complex. Urban terrain maps are one example. Consequently, various techniques can be applied to composite images for hogel display so that the time-varying elements are rapidly rendered (e.g., vehicles or personnel moving in the urban terrain), while static features (e.g., buildings, streets, etc.) are rendered in advance and re-used. According to some embodiments, time-varying elements can be independently rendered from static elements, with considerations made for the efficient refreshing of a scene by re-rendering only the necessary elements in the scene as those elements move. Thus, the aforementioned light field rendering techniques can be combined with more conventional polygonal data model rendering techniques. Still other techniques such as ray casting and ray tracing can be used.

In general, the multi-view rendering system 201 can be configured to process 3D data 296 in the form of geometry and command data and create hogel-based output data in response. This data may be in standard formats for 3D graphics, for example such as OpenGL™ or other formats. A software display driver at host 290 can allow the host application 292 to communicate with the control subsystem 202, which can then relay the appropriate data and signals to the MvPUs 250.

According to one embodiment, host application 292 provides 3D scenes to display system 200. Scene data may include data for one or more 3D models, such as, for example, geometry (e.g., vertex lists), texture, lighting, shading, bounding volumes (e.g., sphere or cuboid) and other information as a description of the virtual scene. For each scene, the host computer may provide a scene description and a view volume of the scene that should be rendered. The multi-view rendering system, however, can remove or reduce the burden of multi-view rendering of a scene as a host application concern.

MvPU controller 210 is provided to distribute render content and manage synchronization of MvPUs 250. MvPU controller 210 can be configured to cache, dispatch and synchronize rendering of the scene by MvPUs 250, which render multiple views of the scene in parallel so that the host system 290 is not burdened with multi-view rendering tasks. Thus, according to one embodiment, host application 292 can dispatch the geometry for a scene frame once to MvPU controller 210. MvPU controller 210 can cache the scene frame and coordinates the MvPUs to render all the appropriate views, preferably without further involvement from the host for that scene frame.

MvPU controller 210 comprises MvPU control processor 220, MvPU controller memory 230 and MvPU controller storage 232, which may be on-chip or other memory. MvPU control processor 220 can comprise a render dispatch/synchronization processor 222 that manages dispatching render content to MvPUs and scene buffer and management processor 224 that manages buffers in MvPU control processor 220.

In one embodiment, MvPU controller 210 can be embodied on a single chip or multiple chips. For example, one or more of I/O 204, render dispatch/synchronization processor 222, scene buffer and management processor 224, MvPU controller memory 230 and or MvPU controller storage 232 may be implemented as an ASIC/chip specifically designed to buffer render content, dispatch render content to MvPUs 250 and/or synchronize MvPUs 250. In other embodiments, an MvPU controller 210 may be implemented as a programmable processor programmed to implement render dispatch/synchronization processor 222 and/or scene buffer and management processor 224. According to one embodiment, MvPU control processor 220 may comprise a programmable processor that executes a set of computer readable instructions 234 stored on a non-transitory computer readable medium (e.g., 234). MvPU controller storage 232 may further include controller configuration data 236 to configure MvPU controller storage 232 and/or MvPUs 250.

MvPUs 250 may be connected to MvPU controller 210 by bus 240, for example an expandable broadcast bus, or other interconnect. MvPU controller 210 and MvPUs 250 may be addressable on bus 240. In accordance with one embodiment, each MvPU 250 is a highly parallel homogeneous computation device dedicated to rendering hogel views for light-field display 200. An MvPU 250 may include an MvPU processor 260, MvPU cache 270 and MvPU storage 272. MvPU Processor 260 comprises a 3D scene conversion processor 262, 2D post processing processor 264 and framebuffer manager 266 that implement parallel graphics pipelines that render multiple views of a scene in parallel. Each pipeline may apply a corresponding viewpoint specific data 276 stored, for example, in MvPU storage 272. As discussed further below, viewpoint specific data 276 may include data a viewpoint specific transform or data from which the viewpoint-specific transform can be derived. Each pipeline may also be configured with a designated render target.

According to one embodiment, 3D conversion processor 262 provides a vertex processor, rasterizer, fragment processor and output merging to convert 3D geometry data to 2D hogel images. 2D post processing processor 264 can apply 2D color and spatial corrections. Framebuffer manager 266 manages writing data to render targets, such as one or more frame buffers 280 of photonics 282. Each MvPU 250 can include a vertex/texture cache 270 to reduce expensive memory requests and arbitration with the memory of controller 210.

In one embodiment, an MvPU 250 can be embodied on a single or multiple programmable chips. For example, an MvPU 250, including 3D conversion processor 262, 2D post processing processor 264, framebuffer manager 266, MvPU cache 270 and/or MvPU storage 272 may be implemented as an Application Specific Integrated Circuit (ASIC/chip) specifically designed to render hogel images (the light-field) with minimum host side support. In other embodiments, an MvPU 250 may comprise a programmable processor programmed to implement 3D conversion processor 262, 2D post processing 214 and framebuffer management 266. MvPU processor 260, for example, may comprise a programmable processor that executes a set of computer readable instructions 274 stored on a non-transitory computer readable medium (e.g., MvPU storage 272).

While, in the foregoing examples, MvPU controller 210 and interface 204 are illustrated as separate from the MvPUs 250, one or more MvPUs 250 may include an integrated controller 210 or interface 204.

Display system 200 includes user display control software and/or hardware 290. Control 290 can be used to adjust basic display parameters including brightness, color, refresh rate, and the like, initiate calibration routines or control other functionality. As with many of the elements illustrated in FIG. 2, user control 290 can be integrated with other system elements, or operate as a separate sub-system. Numerous variations will be apparent to those skilled in the art.

According to one embodiment, user input devices 292 can allow user interaction with the light-field display by, for example, use of a 3D wand/pointer, touch screen, or gesture recognition system. The host application 292 can be responsible for registering, tracking, and responding to input device actions within the light-field. In other embodiments, the user input device 292 can be configured to output a view volume transform (e.g., a view volume transform matrix) that can be processed by multi-view rendering system 201 to change the rendered views.

Figure 3:
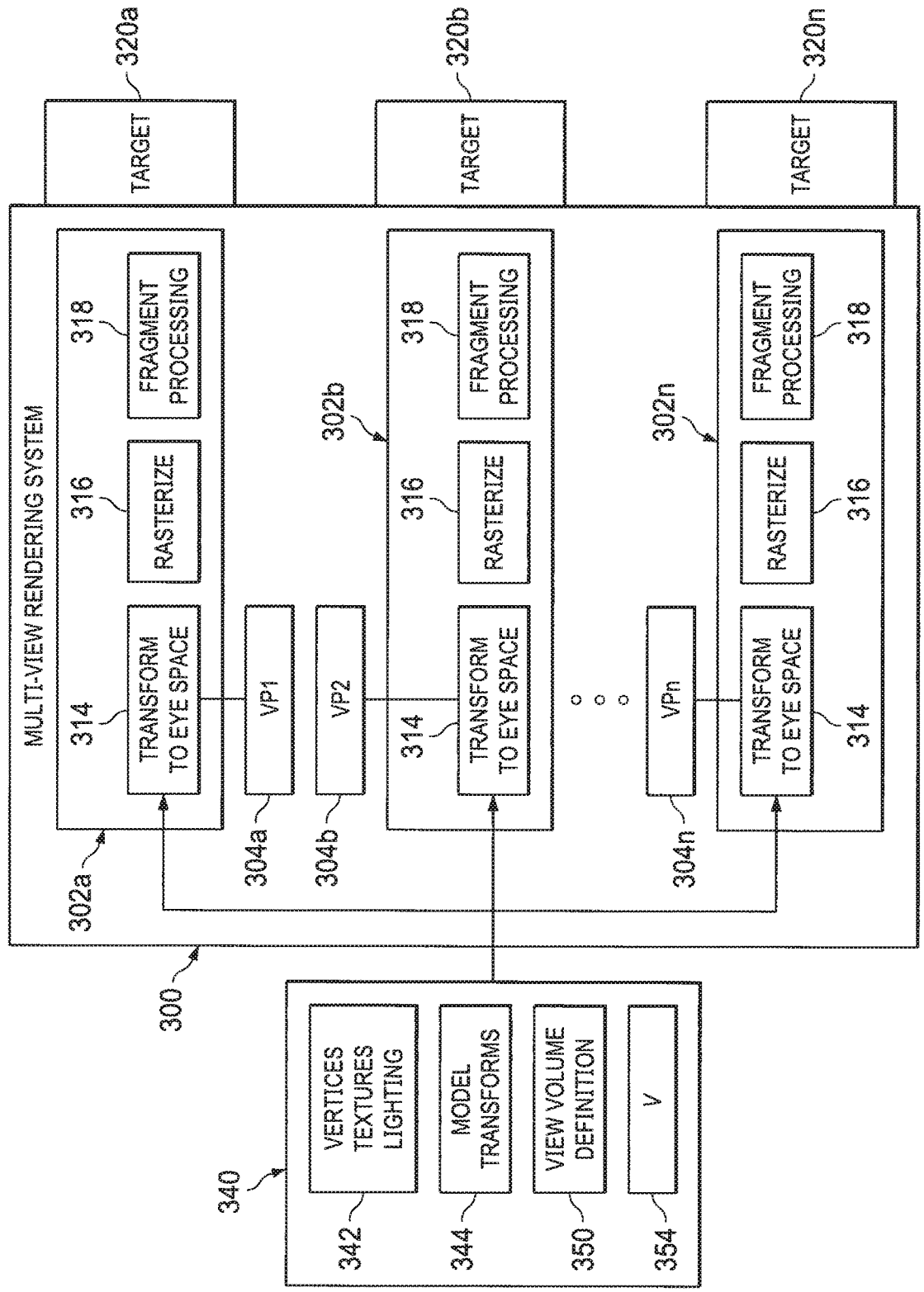
FIG. 3 is a functional block diagram illustrating one embodiment of a multi-view rendering system.

FIG. 3 is a functional block diagram illustrating one embodiment of a multi-view rendering system 300. Multi-view rendering system 300 applies vertex transforms 314 to transform 3D locations and normal to a viewpoint-specific eye space, rasterization 316 and fragment processing 318 to render multiple views of a scene in parallel.

Each view can be rendered into a render target 320a, 320b ... 320n as pixel data. The render targets 320a, 320b ... 320n may be a viewport in a frame buffer, a location in a tagged list that is used by downstream software/hardware to project an image or other location. For each render target, a window size (size/aspect ratio of pixel array to be rendered) and location may be specified whether the render target is a viewport, list or other target.

A render target 320a, 320b ... 320n may be said to correspond to a micro-projector that projects the image rendered to that render target. For example, a viewport in a frame buffer that holds pixel data for projection by a particular hogel can be said to correspond to that hogel. Similarly, if a tagged entry (set of rendered image data) in a list of entries is used by downstream systems to feed a micro-projector, that entry can be said to the correspond to that micro-projector.

In some embodiments, the render target may be a viewport in a buffer local to an MvPU. The MvPU can transfer the image data to a display buffer (e.g., of a micro-projector) at the occurrence of an event, such as receiving a signal from the MVPU controller.

In embodiments in which multi-view rendering system 300 renders into view ports of frame buffers, the frame buffers may include a front buffer and a back buffer. The render pipelines 302a-302n can render data into corresponding viewports in a back buffer while photonics process the image data from the front buffer(s) to display the image. The front and back buffers may then swap.

To facilitate multi-view rendering, multi-view rendering system 300 comprises parallel rendering pipelines 302a, 302b ... 302n (generally referred to as pipelines 302). The rendering pipelines 302 may be implemented in one or more MvPUs (e.g., a single MvPU 150, 250 or a plurality of MvPUs 150, 250 operating in parallel). Each rendering pipeline 302a, 302b ... 302n can apply a different viewpoint 304a, 304b ... 304n to generate multiple views of a scene in parallel and render the view into a designated render target 320a, 320b ... 320n.

To minimize the rendering load, multi-view rendering system 300 can support segmentation of geometry into foreground and background objects. For example, the render API of multi-view rendering system 300 can allow the host application to designate objects as foreground or background. In general, objects that in motion in a scene can be tagged as foreground whereas fixed items, such as terrain and/or buildings, can be tagged as background objects. In the case where the view volume is static between frames, background objects would only need to be rendered once for the frames; only foreground objects in motion would need to be rendered in subsequent frames.

The foreground and background objects can be rendered into separate frame buffers whereby the foreground buffer is overlaid on the background buffer by a photonics driver. While segmentation of the geometry may be responsibility of the host application, support can be implemented within the multi-view rendering system 300 (e.g., within an MvPU render pipeline) to maximize the utility of the segmented render buffers in an efficient manner.

In some cases, different pipelines 302 may be established for the same micro-projector and an image for a particular viewpoint (e.g., a hogel image) segregated into multiple frame buffers (e.g., 2, 3 or more buffers) (or other render targets). The data from the multiple render targets (e.g., buffers) may be blended into a final render buffer using various fusion methods including, but not limited to, alpha blending, z-aware alpha blending or other fusion techniques, such that the displayed (radiance) image is the fusion of two or more buffered (radiance) images.

For example, as noted above, the multi-view rendering system may establish separate pipelines for foreground objects and background objects. Foreground image data may be written to a corresponding foreground render target (e.g., viewport in a foreground frame buffer) by the foreground rendering pipeline and the background image data may be rendered to a corresponding background render target (e.g., viewport in a background frame buffer) by the background rendering pipeline. The final projected image may be the fusion of the images form the foreground and background render targets corresponding to a micro-projector (e.g., the viewports in the foreground buffer and the background buffer corresponding to the micro-projector). As another example, the MvPU may render multiple viewer channels at once with the channel data for a view rendered into a corresponding view port in a buffer for that channel. The image data from the various channel buffers can be blended to form the projected image.

Each pipeline 302a, 302b . . . 302n performs one or more vertex transforms to transform vertex positions and normal vectors defined in data 342 from 3D to 2D space prior to rasterization to render an image of a 3D model/scene that can be projected by a 2D display. As part of rendering a triangle, for example, the vertices of the triangle are converted by a series of linear vertex transforms from their original 3D coordinate system to a 2D location and depth in image pixels.

Before proceeding, some additional context may be helpful. Graphics engines commonly utilize multiple coordinate vector spaces. The original x,y,z coordinates defining a 3D model are commonly defined relative a coordinate vector space for that model, referred to as model space (also known as object space). The position of each vertex of a 3D model may be expressed in model space relative to a standard right-handed 3D coordinate system for that model as:

$$\vec{x}_{model} = \begin{bmatrix} x_{obj} \\ y_{obj} \\ z_{obj} \end{bmatrix}$$

With brief reference to FIG. 5A and FIG. 5B, each vertex of the vehicle model 500 is defined relative to a coordinate system 502 for that model and each vertex of house model 510 is defined relative to a coordinate system 512 for that model, which is independent of coordinate system 502.

A 3D scene can comprise a collection of 3D models, with each 3D model having its own model space. To represent a 3D model in a scene (for example to place the 3D model 500 in spatial relation to 3D model 510), the vertices of the models are transformed (moved, rotated and/or scaled) into a common space, referred to as world space. FIG. 5C, for example, illustrates a scene 525 comprising model 500 and model 510 in a common world space. When models have transformed into world space, the vertices are expressed relative to the world space coordinate system. A model matrix (M) can be applied to move, rotate and scale a model to world space such that:

$$\vec{x}_{world} = \begin{bmatrix} x_{world} \\ y_{world} \\ z_{world} \end{bmatrix} = M \cdot \begin{bmatrix} x_{obj} \\ y_{obj} \\ z_{obj} \end{bmatrix}$$

To render a scene, a graphics pipeline can transform vertices to a view space, also referred to as "camera space" or "eye space," that simulates rendering onto a virtual camera that is arbitrarily oriented in world space. Conventionally, the origin of the virtual camera space coordinate system is the center of the virtual camera with virtual camera viewing down the Z axis of the camera space coordinate system.

In any event, in existing OpenGL™ pipelines, transforming from model space to view space typically includes applying a matrix, GL_MODELVIEW ($M_{Modelview}$ matrix below) that combines a model transform and a view transform:

$$\vec{x}_{eye} = \begin{bmatrix} x_{eye} \\ y_{eye} \\ z_{eye} \end{bmatrix} = M_{Modelview} \cdot \begin{bmatrix} x_{obj} \\ y_{obj} \\ z_{obj} \end{bmatrix}$$

A projection transform P can then be applied to transform vertices into an image space. As is known in the art, the projection transform may be an orthographic projection transform or a perspective projection transform. In a perspective projection transform, vertices in a frustum defined by an X axis field of view ($FOV_x$), Y axis field of view ($FOV_y$), $Z_{near}$ plane and $Z_{far}$ plane are mapped to cuboid with dimensions −1 and 1 for every axis. P, is a 3×4 matrix that converts homogeneous 3D coordinates ($\mathbb{P}^3$) to homogenous 2D ($\mathbb{P}^2$) coordinates. The projection matrix describes the properties of field projection in a conic frustum. Typically, the projection matrix is considered a description of a pinhole imaging system. Object points expressed in a camera centric coordinate system (with Z the direction of the optical axis) are converted into points on the virtual (flipped) image plane.

In OpenGL™, the homogeneous 2D coordinates are generated in a space known as Normalized Device Coordinates (NDC), where the visible image plane is restricted to a finite rectangle (the viewport), rather than a potentially infinite plane. In this case, it is common to clip vertices so that only line segments that lie completely within the frustum are considered in further operations. The 3×4 projection matrix is appended with a final row to generate a clip value which is used to test the homogeneous 2D points for inclusion within the viewable frustum.

$$\vec{x}_{clip} = \begin{bmatrix} x_{clip} \\ y_{clip} \\ z_{clip} \\ w_{clip} \end{bmatrix} = P \cdot \vec{x}_{eye} = \begin{bmatrix} f & 0 & 0 & 0 \\ 0 & f & 0 & 0 \\ 0 & 0 & A & B \\ 0 & 0 & -1 & 0 \end{bmatrix} \begin{bmatrix} X \\ Y \\ Z \\ W \end{bmatrix}$$

$$\vec{x}_{ND} = \begin{bmatrix} \frac{x_{clip}}{w_{clip}} \\ \frac{y_{clip}}{w_{clip}} \\ \frac{z_{clip}}{w_{clip}} \end{bmatrix}, w_{clip} = -Z_{eye}$$

As noted above, the existing OpenGL™ APIs supported by many GPUs allow a host application to specify vertex lists for one or more models in which each vertex is defined in terms of its vertex location in object space (location in a particular model coordinate system). To specify a view of a scene to be rendered, the application can further specify a GL_MODELVIEW matrix to transform the object space coordinates to eye space. The GL_MODELVIEW matrix combines both a model transform that transforms a position in object space to a position in the world space and a view transform that transforms a position in world space to eye space. Using existing graphics pipelines, the GPU can apply the GL_MODELVIEW, projection and viewport transforms to the vertices. In order to cause such a GPU to render a second view of a scene from a different viewpoint, the host application must specify a new GL_MODELVIEW matrix and viewport.

In multi-view rendering system 300, scene geometry is transformed to a viewpoint-specific eye space for each viewpoint for which multi-view rendering system 300 is rendering an image by a transform to eye space module 314 in each pipeline 302*a*, 302*b* . . . 302*n*.

An overall view transform from model space to a viewpoint-specific eye space can be separated into whole display view transforms that apply to all views and more granular, viewpoint-specific transforms 304*a*, 304*b* . . . 304*n* that apply to each specific viewpoint. The viewpoint-specific view transforms or data to derive the transforms may be maintained by an MvPU 150, MvPU 250 (e.g., in viewpoint specific data 176, 276) and thus, the host application (or other component) providing the scene to the multi-view rendering system is relieved of the responsibility of providing a separate view transformation for each viewpoint.

The overall view transform for coordinates or a vector in model space to a viewpoint-specific eye space can be expressed as the dot product of an overall transform matrix (e.g., in right-handed 'Y-Up' coordinate space) and model space. The overall transform matrix may represent the combination of matrices that represent constituent transforms between model and viewpoint-specific eye space. In one embodiment, for example, the transform from model space to viewpoint-specific eye space may be represented as:

$$\vec{x}_{eye} = H \cdot V \cdot M \vec{x}_{model}$$

where H, V and M are matrices representing particular transforms. For example, each of H, V and M may be a 4×4 transform matrices and thus combine to form a 4×4 transform matrix.

In general, M is a model transform matrix that expresses the relationship between a model space and a world space, V is a view volume transform matrix that expresses the relationship between a view volume that represents a volume about the optical center of the display and world space and H is a viewpoint-specific transform (e.g., a viewpoint 304*a*, 304*b* . . . 304*n*) that expresses the relationship between a particular viewpoint and the view volume, where a viewpoint corresponds to a projector location in the display.

Multi-view rendering system 300 receives 3D data 340 for a scene that includes geometry data 342, including data for one or more 3D models. The vertices and normals for a 3D model may be expressed in a model space (object space) for that model that has homogeneous 3D coordinates ($\mathbb{P}^3$), of any scale. The model space position of a vertex represents the original vertex position within a 3D model.

Multi-view rendering system 300 can also receive model transforms 344 (e.g., M matrices) to move, rotate and scale 3D models to a common world space that has a homogenous 3D coordinates ($\mathbb{P}^3$) and a unified 'world scale' (which may be application dependent) for vertex locations within a scene. Model matrices may be 4×4 matrices, as is known in the art, or other matrices.

Multi-view rendering system 300 further receives a view volume definition 350 and a view volume transform (V). According to one embodiment, view volume definition 350 includes i) a transformation matrix that defines the position and orientation of the center of a view volume in model space and ii) view volume bounds in model space. The transformation matrix can be, for example, a 4×4 transform matrix (e.g., in right-handed 'Y-Up' coordinate space) and the view volumes bounds can be specified as a vector that defines the half widths of a bounding cuboid. The transformed z=0 plane in model space represents a display plane, discussed further below.

The 3D data 340 may be received from one or more sources. According to one embodiment, 3D data 340 is received from a host application (e.g., host application 52, 192). In another embodiment, at least a portion of 3D data 340, such as V 354, can be received from a user input device (e.g., user input device 192, 292). The viewpoint-specific transforms (H) can be maintained in multi-view rendering system 300. Thus, the host application or other source can be relieved of the burden of determining and dispatching viewpoints for each view to be rendered in a refreshing of the scene.

As noted above, each transform matrix M, V, H can be conceptualized as transforming geometry between vector spaces. For example, model space geometry can be transformed to world space:

$$\vec{x}_{world} = M \vec{x}_{model}$$

Figure 5D:
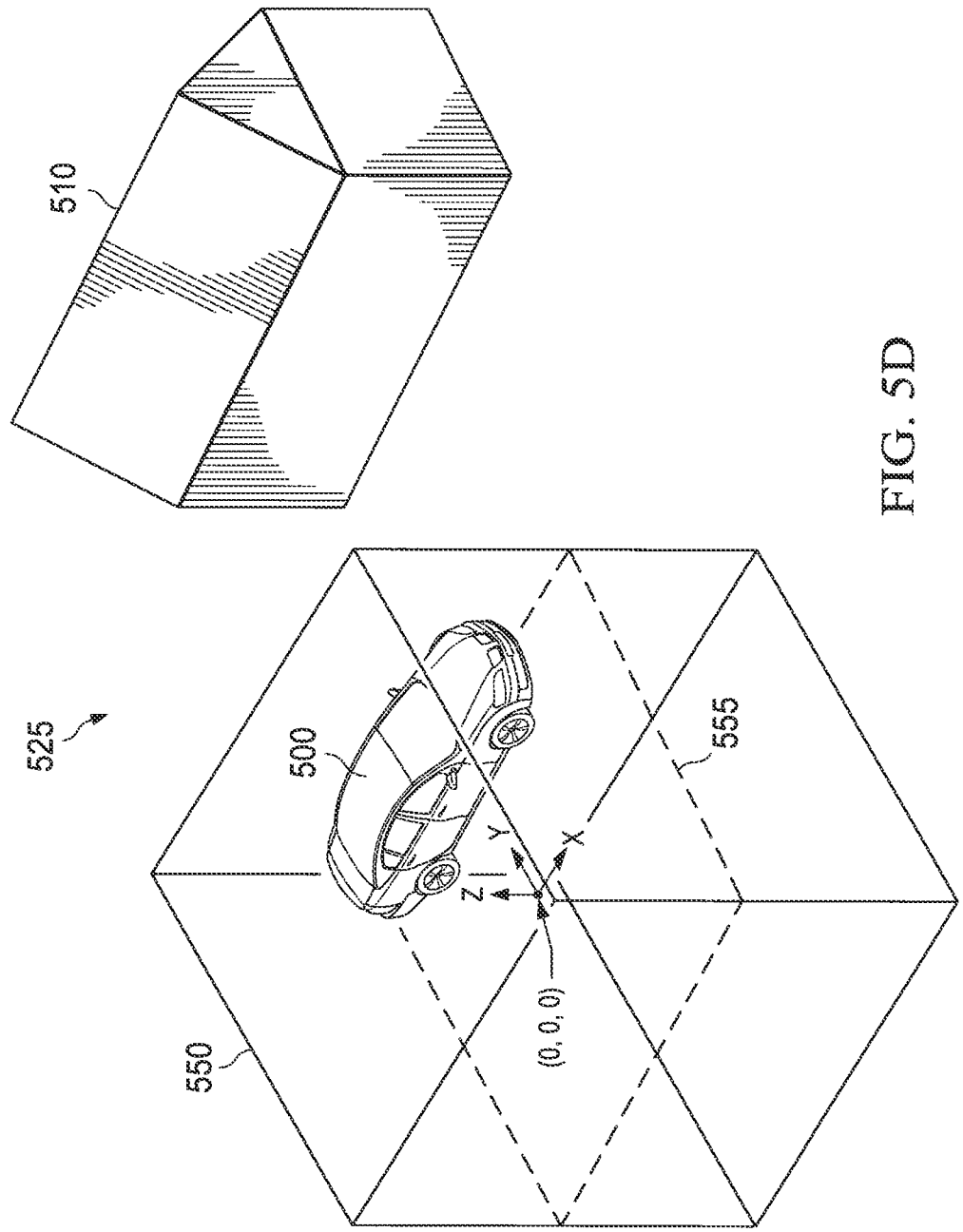
FIG. 5D is a diagrammatic representation of one embodiment of a view volume relative to a scene.

World space may be transformed to a view volume space (e.g., a normalized view volume space) based on the specified view volume 350, one example of which is illustrated as view volume 550 of FIG. 5D placed in scene 525 and defining a view volume space. The z=0 plane of the view volume in the view volume space (e.g., plane 555 of view volume 550) is the display plane. Multi-view rendering system 300 can be configured such that (0,0,0) of the display plane corresponds to the optical center of the physical display to which multi-view rendering system 300 is rendering. According to one embodiment, the position of a vertex in world space may be defined in the view volume space as follows:

$$\vec{x}_{VV} = V \vec{x}_{world}$$

The view volume space may have a homogenous 3D coordinate system $\mathbb{P}^3$ and be unity scaled.

In transforming a vertex that falls within the view volume from world space to the view volume space, the relative vertex location within a selected world space region is fit to the 3D view volume. According to one embodiment, in the view volume space coordinate system, the X coordinate vector is aligned with display Easting, Y coordinate vector with display elevation, and Z coordinate vector with display Southing.

The vertices in the view volume space may be transformed to a viewpoint-specific eye space. The viewpoint-specific eye space, according to one embodiment, has a homogenous 3D coordinate system $\mathbb{P}^3$ and is unity scaled.

Each viewpoint represents a discrete virtual camera location and can include a camera position and orientation expressed relative the view volume normalized relative to a reference, such as, for example, the center of a micro-projector. The viewpoint may be maintained as a viewpoint transform matrix (H) that can transform vertex coordinates in view volume space to the viewpoint-specific eye space as follows:

$$\vec{x}_{eye} = H \vec{x}_{vv}$$

For example, for each micro-projector for which it is responsible, multi-view rendering system 300 can maintain a micro-projector viewpoint (e.g., a specific transform (H)) that represents a render camera position and orientation relative the center of an overall display, which can be assumed to occur at (0,0,0) on the display plane. For a display with a flat image plane (the image plane of each viewpoint lies on the display plane (e.g., display plane 555 of FIG. 5E)), the viewpoint transform may be reduced to a micro-projector's relative x, y position in the display (for example a 4D vector which can be applied as a single column 4D vector (x, y, 0, 0).

The viewpoint transform translates and rotates view volume space positions such that, in the viewpoint-specific eye space for a micro-projector, the origin (0,0,0) corresponds to the optical center of the micro-projector, X is aligned with the micro-projector column vector, Y with the micro-projector row vector, and Z with micro-projector optical axis (positive z out of the image plane, −z behind the image plane, where the image plane is the X,Y plane that includes (0, 0, 0) of the view-point specific eye space). Thus, a position in the view volume space may be transformed to a viewpoint-specific eye space (a camera space for a render camera having a location and orientation in the view volume space corresponding to the location and orientation of a micro-projector in the display).

For example, in VR/AR headset that has two sub-displays that present parallel views of a scene, an MvPU can maintain a view point transformation matrix (H) for each projector (e.g., one for the left projector and one for the right projector). H for the right projector transforms vertex positions in the view volume space to an eye space for a viewpoint corresponding to a right projector with an origin corresponding to the optical center of the projector and Z aligned with the optical axis of the right projector, whereas the H for the left projector transforms vertex positions in the view volume space to a viewpoint-specific eye space for a left projector with an origin corresponding to the optical center of the left projector and Z aligned with the optical axis of the left projector.

As another example, for an MvPU 150, 250 that renders hogel images for a plurality of hogels, the MvPU can maintain a viewpoint-specific transform (H) (referred to as a hogel transformation matrix in this example) for each hogel for which the MvPU renders images. Each H transforms vertex positions in view volume space to positions in a corresponding hogel eye space. For each hogel, view volume space positions are translated and rotated such that origin (0,0,0) corresponds to the optical center of a hogel, X is aligned with the hogel column vector, Y with the hogel row vector, and Z with the hogel optical axis (positive z in viewer direction, negative z into the display).

Figure 5E:
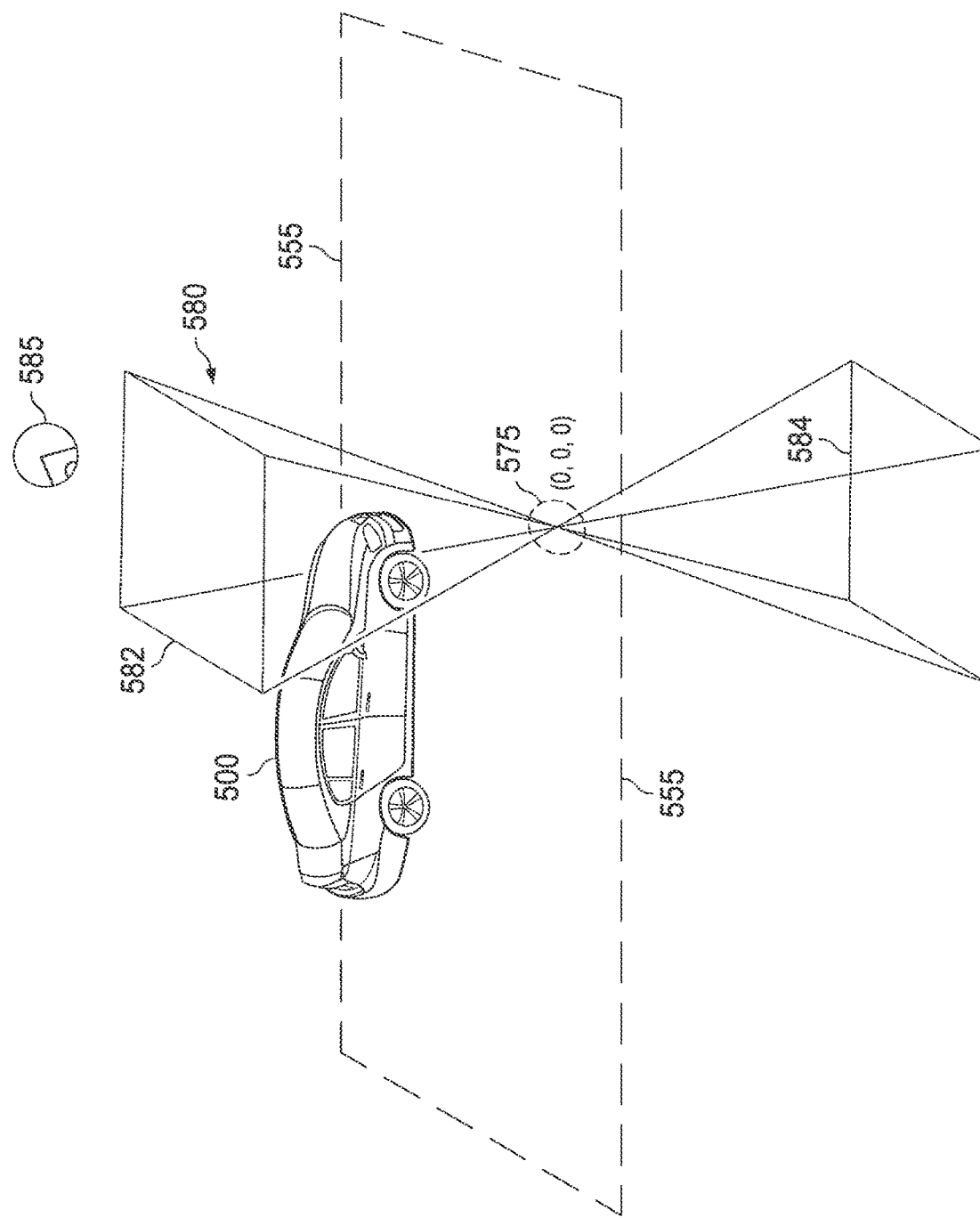
FIG. 5E is a diagrammatic representation of one embodiment of eye space.

Turning briefly to FIG. 5E, FIG. 5E illustrates a virtual hogel 575 lying on display plane 555. Virtual hogel 575 represents to the position and orientation of the actual hogel of a display system (e.g., display system 100, 200) to which a particular pipeline 302 is rendering and is defined by the viewpoint (e.g., H) for that hogel. FIG. 5E further illustrates that the view volume space has been transformed to hogel eye space with an origin at (0,0,0).

Arriving at a viewpoint specific eye space can thus be achieved by applying a 4×4 linear transformation model (M), view volume transform (V) and viewpoint-specific transformation (H) matrices:

$$\vec{x}_{eye} = H \cdot V \cdot M \cdot \vec{x}_{model}$$

The multi-view rendering system 300 may or may not determine positions and normal for world space and view volume space depending on configuration.

Using the (0, 0, 0) as a camera position in eye space, multi-view rendering system 300 can apply projection transforms, a rasterizer 316 and fragment processing 318 to render triangles defined in eye space into pixel buffer colors and depths using a variety of techniques.

In general, rasterization is the process of converting a polygonal model into a raster or pixel image; for example, rasterization renders a hogel image data (or other multi-view image) from a triangle list. A rasterizer 316 in each pipeline 302a-302n rasterizes the geometry data to a 2D array of pixels. Rasterization occurs after the vertex transform stage of the render pipeline and generates a list of fragments. The fragments are shaded during fragment processing 318 based on the textures associated with the scene. For example, the texture mapped on the surface of each polygon can be based on a linear interpolation of the texture coordinates.

The rasterizer 316 and fragment processing 318 may apply rasterization, shading and lighting techniques known in the art. As will be appreciated, rasterization and fragment processing can be configured for the particular display device. For example, an MvPU in a stereoscopic AR/VR headset can utilize standard techniques to rasterize pixels on a single side of the image plane, whereas an MvPU in a light field display can be configured to rasterize geometry on both sides of the image plane.

According to one embodiment, a rasterizer 316 can implement scanline rasterization. The rasterizer 316 first sorts a list of triangles based on their y-value. Then, as the scanline is advanced down the image, the top most (closest) triangle relative to a virtual viewer is selected to create a fragment for shading. The fragment can be checked against the Z-buffer which provides a mechanism to preserve the closest fragment to a viewer in the event there are multiple triangle fragments that are in competition for shading.

In some displays, such as a stereoscopic AR/VR display, the viewer may be considered to be a virtual camera at origin (0, 0, 0) of the eye space looking up (along the z axis) such that the rasterizer preserves the fragments closest to the virtual camera. Various techniques for rasterizing based on a virtual camera at a location are known in the art and may be used.

In a light field-display, the viewer of a pixel is considered to be located above the upper half of the frustum and to be gazing in a direction to see the pixel (e.g., as represented by viewer 585 in FIG. 5E). Thus, the rasterizer may preserve the pixel data for the fragment closest viewer 585. Various techniques for rasterizing image data for a light-field display are known in the art may be employed.

According to one embodiment, each render pipeline can apply a double frustum rendering method for each viewpoint. This method uses two opposing camera frusta, one at either side of the image plane. An implementation of the double frustum method was developed by Michael Halle and Adam Kropp, and is described in the technical paper, "Fast Computer Graphics Rendering for Full Parallax Spatial Displays," Proc. Soc. Photo-Opt. Instrum. Eng. (SPIE), 3011:105-112 (Feb. 10-11, 1997) (referred to as the "Halle-Kropp" technique herein). Other examples of rendering methods are described in U.S. Pat. No. 6,366,370 (the "'370 patent"), entitled, "Rendering Methods for Full Parallax Autostereoscopic Displays," issued Apr. 2, 2002, which is hereby fully incorporated by reference for all purposes. According to various embodiments, a render pipeline 302 may apply the Halle-Kropp techniques, techniques described in the '370 patent or other double frustum techniques to render a view-point specific image.

The Halle-Kropp and double frustum techniques of the '370 patent require defining two frusta for a given location and two passes of virtual render cameras, one for a top frustum and one for a bottom frustum. Embodiments described herein may apply improved rendering techniques. More particularly, some embodiments may apply double-sided frustum (referred to herein as a "bowtie" frustum) rendering techniques. These techniques are more efficient than traditional double frustum techniques.

With a bowtie frustum technique, a frustum is defined for a camera position in which the frustum bounded by six planes: planes at z=+/−1 and four side planes where the side plane edges that span between the z plane and −z plane all pass through the origin (0,0,0). The angle between opposite side planes may correspond to the field of view (FOV) of the micro-projector for which the pipeline is rendering. Thus, for example, frustum 580 of FIG. 5E is a single frustum having two sides, a first side 582 above the image plane (a top portion) and a second side 584 below the image plane (a bottom portion). The bowtie rendering techniques discussed below can be applied using the bowtie frustum.

In some cases, it may be preferable to simplify some downstream calculations by using a normalized eye space. Vertex positions can be transformed into a corresponding normalized viewpoint-specific eye space by a projection transform (P), such that:

$$\vec{x}_{n\text{-}eye} = P\vec{x}_{eye}$$

According to one embodiment, the projection transform is a 3×4 projection matrix that maps a viewpoint-specific eye space onto an ideal 90° frustum (for example frustum 580 of FIG. 5E may be an ideal 90° frustum).

The normalized eye space may have a Cartesian coordinate system $R^3$, scaled by field of view of a corresponding micro-projector (e.g., field of view of a hogel lens) such that the fore and aft z-far planes occur at z=+/−1, and the frustum planes form a 90° frustum, intersecting the z-top plane at x=−1 (left), x=1 (right), y=−1 (bottom), y=1 (top). The projection transform can be dependent on the micro-projectors (e.g., hogels) to which the multi-view rendering system 300 is rendering. If each micro-projector (e.g., hogel) has the same field of view, each MvPU of the multi-view rendering system 300 may store a single P transform matrix. If the micro-projectors have different fields of view, the MvPUs may store a P for each micro-projector.

Non-limiting embodiments of bowtie frustum rendering techniques are discussed below in conjunction with FIGS. 10-15. These techniques may be applied using a non-90° frustum or an ideal 90° frustum.

In addition or in the alternative to implementing more efficient bowtie rendering techniques, multi-view rendering system 300 may implement a number of optimizations such as view volume culling and frustum culling. The render API to multi-view render system 300, can support the specification of the bounding volume (spherical or cuboid) for each model that encompasses the geometry so that within the multi-view rendering system (e.g., within the MvPU), geometry culling can occur on a whole display or per viewpoint camera basis.

With view volume culling, the view volume coordinates in world space can be determined. Any model having a bounding volume in world space that falls completely outside of the view volume in world space can be culled. As another example, any model having a bounding volume in view space that falls entirely outside of the view volume can be culled. With reference to FIG. 5D, for example, house 510 may be culled based on view volume 550.

Frustum culling is a rendering optimization typically implemented in software to increase rendering rates. Objects that are not visible within the render camera frustum are culled from the raster pipeline. Frustum culling can be implemented on a per camera render basis, which means that some frustum cameras may see the geometry and others may not.

Figure 5F:
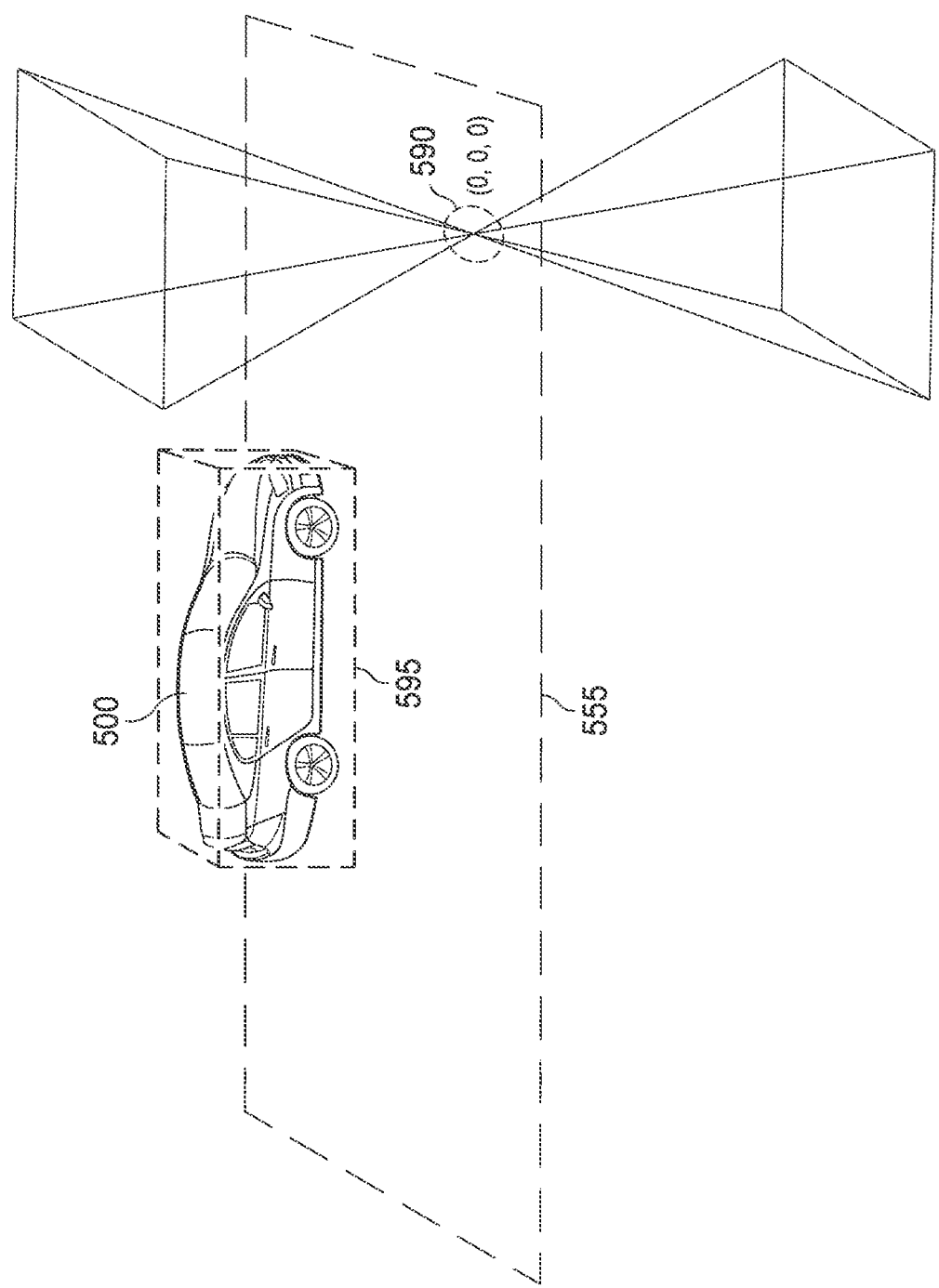
FIG. 5F is a diagrammatic representation of one embodiment illustrating a bounding volume for a model.

For example, in FIG. 5E, the vehicle 500 clearly intersect frustum 580 and will be preserved in eye space for hogel 575. FIG. 5F, on the other hand, illustrates that no part of bounding volume 595 for vehicle 500 appears in the frustum for virtual hogel 590. Consequently, the geometry for model 500 can be culled from the hogel eye space for hogel 590.

As another example, a pipeline may implement triangle culling in which the pipeline removes triangles from the render pipeline that face away from the viewer (for example, viewer 585 or the virtual camera depending on display type).

Moreover, much of the pixel data generated during image rendering is at a pixel level similar to spatially adjacent pixels in neighboring images or temporally adjacent pixels from previously generated images. By spatially or temporarily rendering a subset of a radiance image and sampling generated hogel images to relieve the gaps, an approximation of the full radiance image can be generated at a much lower computation cost. These sampled hogel images reduce the required number of render passes through the geometry and may be sufficient in detail to stand in for fully generated hogel detail.

This optimization may be applied within a photonics driver and throttled according to the rendering load. For instance, in the case where the background buffers require regeneration during a scene pan, then the background hogel images could be generated at either a spatially or temporally down sampled manner to keep the frame rate high while in motion; when the motion stops, the background can then be generated at high resolution to fill in the missing detail.

The render pipelines 302a-302n may further include correction of the rendered images to account for any micro-lens distortions or color aberrations. The particular corrections applied may depend on the type of display. For a light-field display, for example, the corrections can include the resampling of the hogel image data to rectify hogel micro-lens projection issues/distortions such as barrel or pin-cushion distortion or any other lens spatial distortion of the pixel data. This correction can be applied on a per-hogel image basis to induce a geometric pre-distortion of each hogel image. Because micro-lens distortion depends on light wavelength, these geometric corrections are performed on a per-color channel basis.

The 2D corrections also include within pixel color adjustments to balance uniformity, black-level, and brightness of projected pixels. These corrections addresses non-uniformities within the SLM, including possible corner-to-corner brightness fall-off, also known as vignetting. Additionally, these corrections address micro-lens induced brightness and color aberrations depending on where a pixel is located within the micro-lens image plane. This includes micro-lens induced vignetting.

Corrections may also include the correction and balancing of the contrast and color across all SLMs (or other modulators) within the system to achieve color and brightness uniformity throughout the aerial image. Without this correction step, SLM to SLM seams appear as a visual artifact in the 3D aerial projection. This SLM-to-SLM correction technique is commonly known as gamut correction and brightness balancing.

Specific values and models used for the 2D hogel image corrections described above are display and hogel specific and can be determined during a calibration process, stored in the MvPU controller memory, and transferred to the MvPUs to configure the 2D correction process for each assigned hogel image.

According to one embodiment, the multi-view rendering system may implement corrections such as described in Johnson, Tyler, et al. "Multi-projector image correction on the GPU," Workshop on Edge Computing Using New Commodity Architectures, 2006, which is hereby fully incorporated herein by reference for all purposes.

Figure 4:
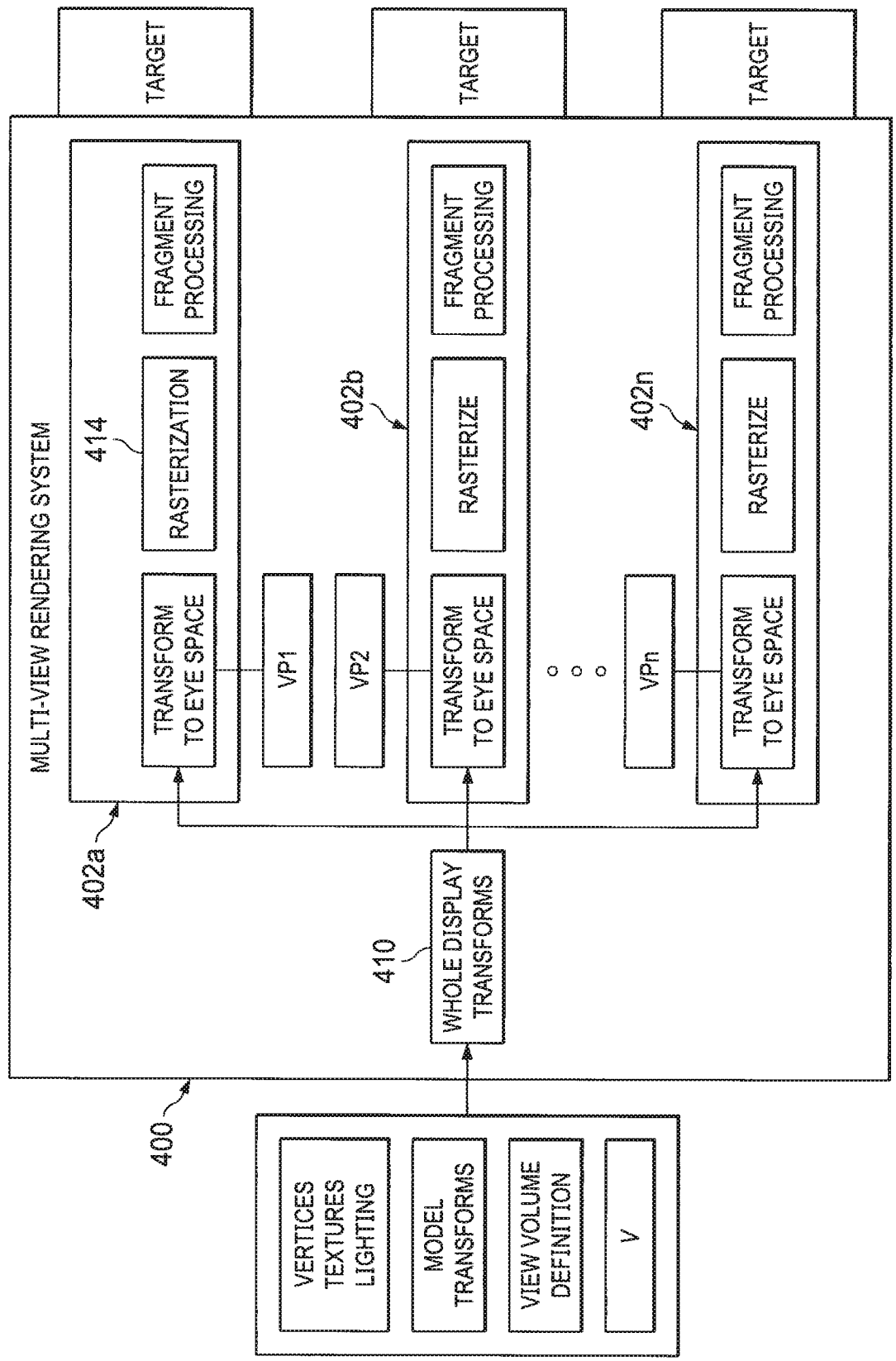
FIG. 4 is a functional block diagram illustrating another embodiment of a multi-view rendering system.

FIG. 4 illustrates another embodiment of a multi-view rendering system 400, which may also be an example of multi-view rendering systems 101, 201. Similar to multi-view rendering system 300, multi-view rendering system 400 comprises parallel rendering pipelines 402a, 402b . . . 402n (generally pipelines 402), which may be implanted by one or more MvPUs. In FIG. 4, however, transforms that apply regardless of view being rendered (whole display transforms 410) (e.g., such as, applying M or V) can be performed prior to parallel rendering pipelines 402a. In various embodiments, whole display transforms 410 may be performed by the MvPU controller (e.g., MvPU controller 110, 210) or an MvPU (e.g., an MvPU 150, 250) prior to the scene geometry entering the parallel rendering pipelines 402. Transform to eye space 414 in each render pipeline 402a, 402b . . . 402n can then apply the remaining transforms. The embodiment of FIG. 4 can otherwise function similarly to that of FIG. 3.

Figure 6:
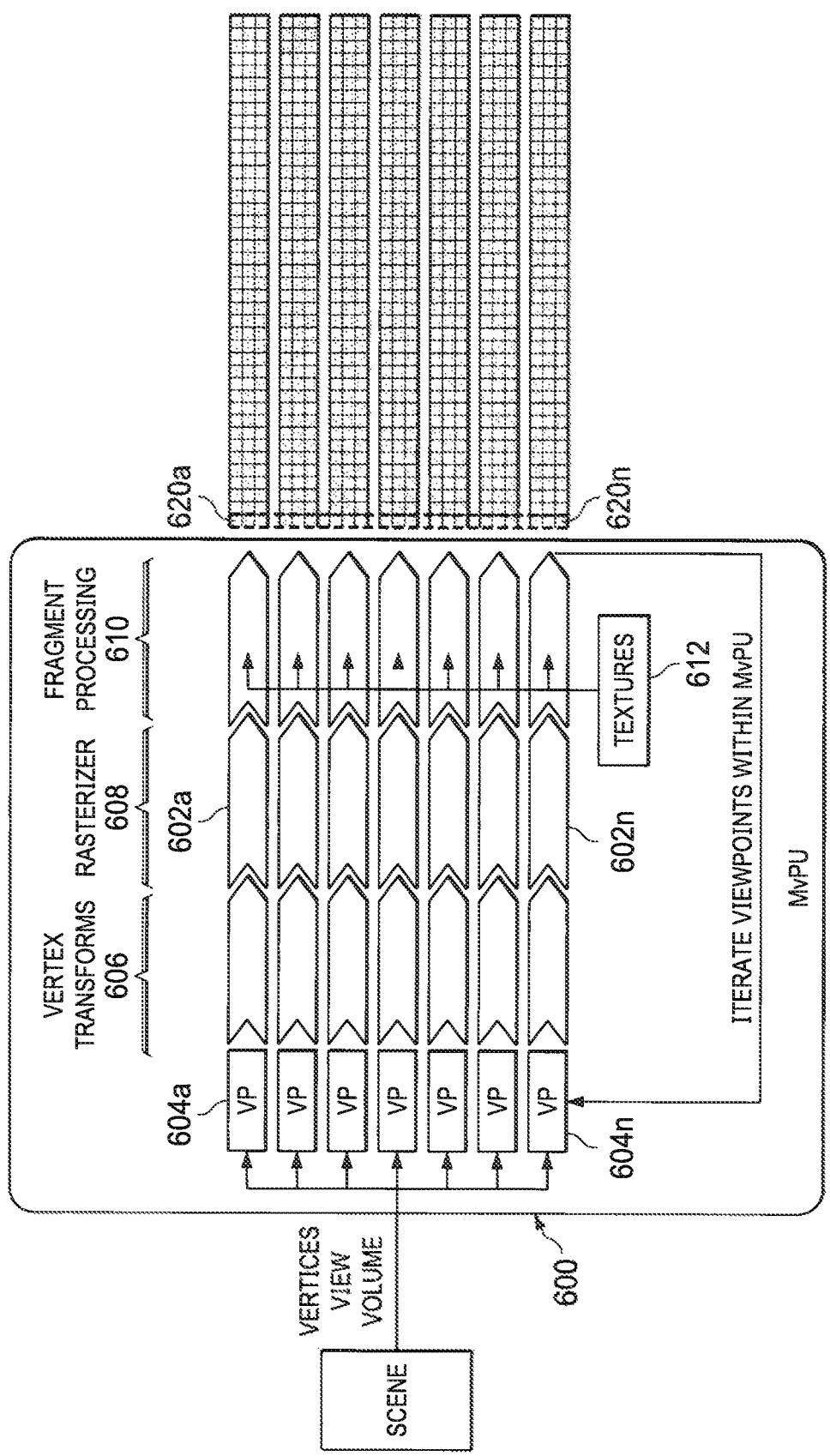
FIG. 6 is a diagrammatic representation of one embodiment of a multi-view processing unit.

FIG. 6 is a diagrammatic representation of one embodiment of an MvPU 600, which may be one example of an MvPU 150, 250. In the embodiment illustrated, MvPU 600 implements multiple parallel pipelines 602a-602n, with each pipeline rendering for a particular micro-projector's viewpoint (for example, a particular hogel's viewpoint). There may be fewer pipelines than hogels for which MvPU is responsible and the MvPU can iterate through viewpoints/viewports to render all applicable views (hogel images) for the hogels for which the MvPU is responsible.

MvPU 600, according to one embodiment, can comprise a highly parallel array processor configured for parallel computation of tasks and data where many threads can be executing logic against a series of queued tasks. In one embodiment, triangles are dispatched to separate render pipelines 602a-602n that all execute the same series of instructions to render their particular views. Therefore, hogel views can be assigned into work groups that are distributed among, for example, accelerator cores and executed concurrently. In some embodiments, most of the hogel processing pipeline can then be reduced to a single parallelizable kernel that operates in conjunction with control functions that control management and synchronization. The control functions may be distributed between an MvPU and MvPU controller.

Each pipeline 602a-602n can have a queue (workgroup) of viewpoints/viewports to render and a frame may be considered rendered when all the queues are empty. MvPU 600 synchronizes between pipelines, for example, by managing triangle vertex dispatch and texture accesses within the MvPU. If every render pipeline 602a-602n was free-running then there may be contention for MvPU bus bandwidth and memory access. Therefore, dispatch of triangles within an MvPU 600 can be synchronized so all the render pipelines are working on the same triangle or texture in parallel, but from their unique viewpoints 604a-604n.

According to one embodiment, the MvPU 600 indexes through the geometry of the scene and the array of render targets (e.g., viewports corresponding to hogels), the operation is given hogel rendering priority. In other words, a batch of geometry can be loaded to high speed cache and the hogel images rendered in parallel, then the next batch of geometry is loaded and the render targets are indexed again. This is the opposite of a traditional GPU when multi-view rendering where all geometry is rendered against one hogel before moving to the next hogel. Hogel priority rendering can allow the MvPU 150 to better manage geometry and texture cache loads and accesses.

For each render pipeline, a 3D scene conversion processor can apply various vertex transforms 606. In particular though, the MvPU 600 can internally manage a list of viewpoints (e.g., viewpoints 604a, 604n, which can be stored as viewpoint specific data 176, 276), where each viewpoint corresponds to a different hogel (or other display element) for which the MvPU renders images. As discussed above, an MvPU may be responsible for more micro-projectors than it has pipelines and thus may manage more viewpoints than it has pipelines.

The vertex transforms 606 applied in a pipeline can include view transforms according to a particular micro-projector's viewpoint. In particular, each parallel render pipeline 602a-602n can be configured to apply different viewpoints 604a-604n to transform vertices to corresponding viewpoint-specific eye spaces and normalized eye spaces. For example, if render pipeline 602a is allocated to render a view for hogel 620a, then the vertex transforms 609 applied by render pipeline 602a will apply viewpoint 604a for hogel 620a, whereas if render pipeline 602n is allocated to render a view for hogel 620n, render pipeline 602n can apply viewpoint 604n corresponding to hogel 620n. The MvPU 600 can thus be responsible for determining the view or other transforms specific to the multi-view nature of the display.

According to one embodiment, a host application can provide a model space view definition that includes a view volume definition. The host application (or other source) can further provide a view volume world transform (V). MvPU 600 can store a hogel viewpoint (represented by 604a-604n) and render target (viewport in a frame buffer, portion of a tagged list or other target) for each hogel for which it renders views. A hogel viewpoint may be, for example, a matrix or vector (H) that represents the hogel's normalized position within the extent of a light-field display. If the modulator of the display is curved or misaligned with the array of hogel lenses, the hogel's viewpoint may be a matrix that includes a normalized position and orientation determined through calibration of the display system. The values of the viewpoint vector/matrix in a particular implementation depend on the geometry of the display, hogel optics (e.g., optics 284) and photonics (e.g., photonics 282), position of the hogel, orientation of the hogel, etc.

The host application can thus be relieved of knowing/selecting viewpoints/viewports for the multi-view display. As such, the same software driver at the host computer can potentially be used for multiple types of multi-view displays that incorporate an MvPU system. The host application can send scenes without regard to the size of the display, number of views supported or viewpoint attributes, etc.

A rasterizer 608 in each pipeline 602a-602n rasterizes the geometry data to a 2D array of pixels. Rasterization is the process of converting a polygonal model into a raster or pixel image; for example, rasterization renders a hogel image data (or other multi-view image) from a triangle list. Rasterization occurs after the vertex transform stage of the render pipeline and generates a list of fragments. The fragments are shaded during fragment processing 610 based on the textures 612 associated with the scene. For example, the texture mapped on the surface of each polygon can be based on a linear interpolation of the texture coordinates. According to some embodiments, pipelines 602a-602n can implement bowtie frustum rendering.

The final stage of each MvPU processing pipeline 602a-602n may include correction of the rendered images to account for any micro-lens distortions or color aberrations. Various examples of corrections include, but are not limited to those discussed above in conjunction with FIG. 3. MvPU 600 can support foreground and background geometric segmentation. Furthermore, each render pipeline 602a-602n may implement a number of optimizations such as frustum culling, triangle culling and other techniques.

Synchronization of MvPUs can occur at specific times. Since the time to render may be proportional to the number of views and the complexity of the scene within each view, render times can vary between MvPUs. MvPU 600 monitors each of the pipelines 602a-602n, and when each pipeline has finished rendering a scene frame, the MvPU 600 sends a render complete signal to the MvPU controller. When the MvPU controller receives a render complete signal from all the MvPUs in a display system, the MvPU controller can send a synchronization signal to the MvPUs to cause the MvPUs to display the rendered images. In response to the synchronization signal, MvPU 600 writes the rendered data into the buffers of the photonics, signals the photonics that an image has been rendered or takes other action to indicate that an image is ready to be displayed. This can help ensure all pixel data from multiple pipelines is made available at the same time to photonics to prevent flickering or other effects if the MvPUs or pipelines within an MvPU render at different rates.

Moreover, as is understood by those in the art, the frame buffers to which an MvPU renders (e.g., frame buffers 180, 280) may comprise front and back frame buffers that swap. In the case in which a view is rendered into multiple frame buffers (e.g., a foreground buffer and background buffer, channel buffers) there may be a front buffer and back buffer for each type of frame buffer (e.g., a front foreground buffer, back foreground buffer, front background buffer, back background buffer, etc.). In any event, the render pipelines of MvPUs can render data into corresponding viewports in a back buffer(s) while photonics (e.g., the SLMs) process the image data from the front buffer(s) to display the image. When MvPU 600 has fully rendered the views of the scene for which the MvPU 600 is responsible into the back buffer(s) of the frame buffers, a swap state is reached in which the front and back buffers corresponding to the MvPU 600 can swap. The MvPU 600 can indicate to an MvPU controller that the swap state has been reached. According to one embodiment then, a point of synchronization is when all the MvPUs of a display system are done rendering to the back buffers and the MvPUs are ready to swap buffers. When the MvPU controller receives an indication that each MvPU in the display system has reached a swap state, the MvPU controller can send a single the MvPUs and the MvPUs (e.g., MvPU 600) can signal the photonics to swap the buffers.

Figure 7:
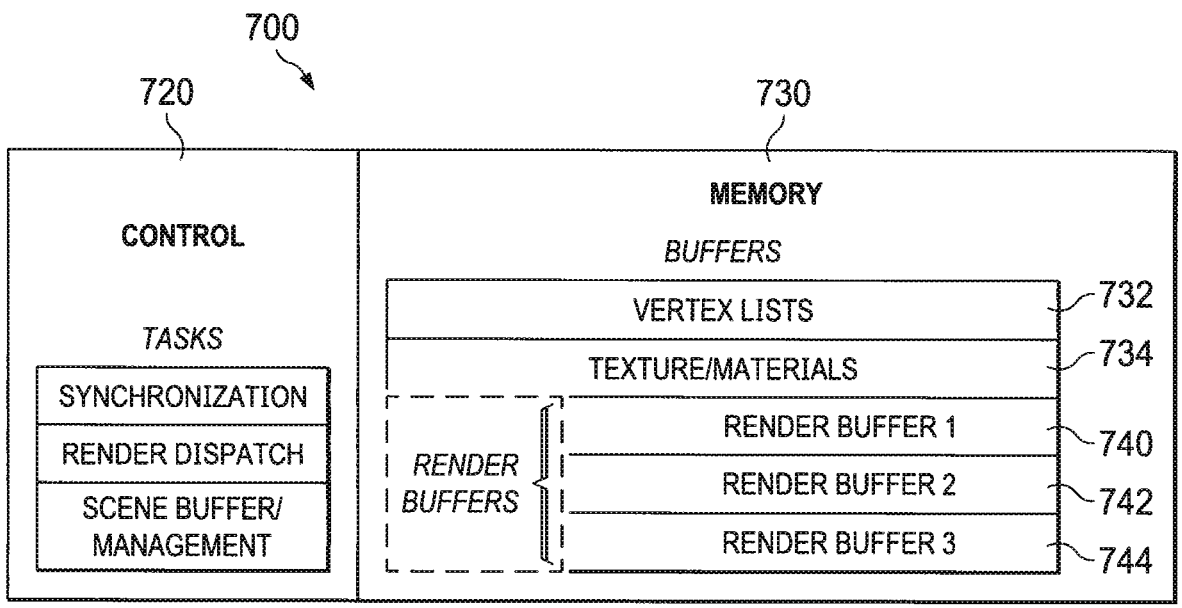
FIG. 7 is a diagrammatic representation of one embodiment of a multi-view processing unit controller.

FIG. 7 illustrates one embodiment of an MvPU controller 700 in more detail. MvPU controller 600 may be one embodiment of an MvPU controller 110, 210. MvPU controller 700 is configured to cache, dispatch and synchronize rendering of scenes to one or more MvPUs (e.g., MvPUs 150, 250) so that the host system (e.g., host system 50, 290) is not burdened with multi-view rendering tasks.

MvPU control processor 720 may implement a variety of tasks including, but not limited to, synchronization, render dispatch and scene buffer/management tasks. Scene buffer/management tasks, which may be implemented by a scene buffer and management processor, can include caching scenes and buffering render lists. Synchronization and dispatch tasks, which may be implemented by render dispatch/synchronization processor, can include tasks to listen for and send synchronization signals from/to MvPUs and dispatch render lists to the MvPUs.

MvPU controller memory 730 is divided into vertex and texture caches (vertex cache 732, texture cache 734) and a plurality of render buffers (e.g., render buffer 740, render buffer 742, render buffer 744). In this example, the render buffers can provide triple buffered render lists so that while the host is updating a scene frame, the MvPUs can render the previous frame uninterrupted.

Controller 700 can provide an API or other interface that includes commands for caching vertex lists and textures (e.g., using OpenGL™ or other commands). To render efficiently, host applications (e.g., host application 52, host application 292) can cache the scene (e.g., vertex lists and textures) into the MvPU system before issuing any draw calls. As vertex list and textures are cached, control processor 720 assigns resource IDs to be used for rendering. Once the geometry and textures are cached within the controller 700, the render lists can dictate the caching and subsequent rendering of vertex lists and textures onto the MvPUs.

According to one embodiment, render lists are triple buffered (FIGS. 8A and 8B) to allow rendering commands to be cached without interfering with multi-view image rendering. By pre-caching all the geometry and textures in the vertex cache 732 and texture cache 734, the host and MvPU render engines can render scene content at independent rates. This can facilitate scene management since the host application may be running at a frame rate that exceeds the display system's render capabilities. Triple buffering the scene allows the host applications to run at a frame-rate independent of the display system while allowing to the MvPUs to always have a complete 'next' frame to render.

Figure 8A:
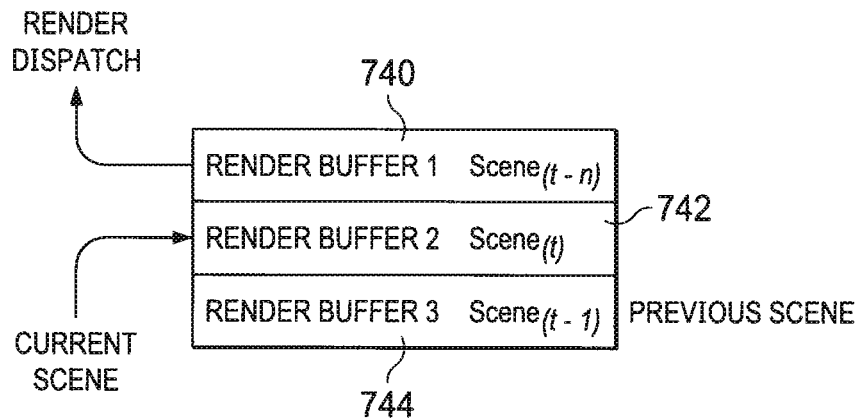
FIG. 8A and FIG. 8B are diagrammatic representations of one embodiment of buffer management.
Figure 8B:
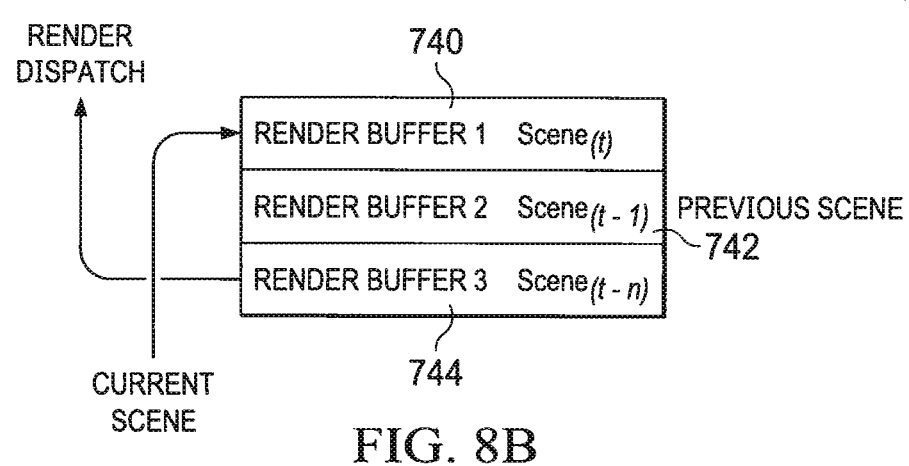
Figure 10:
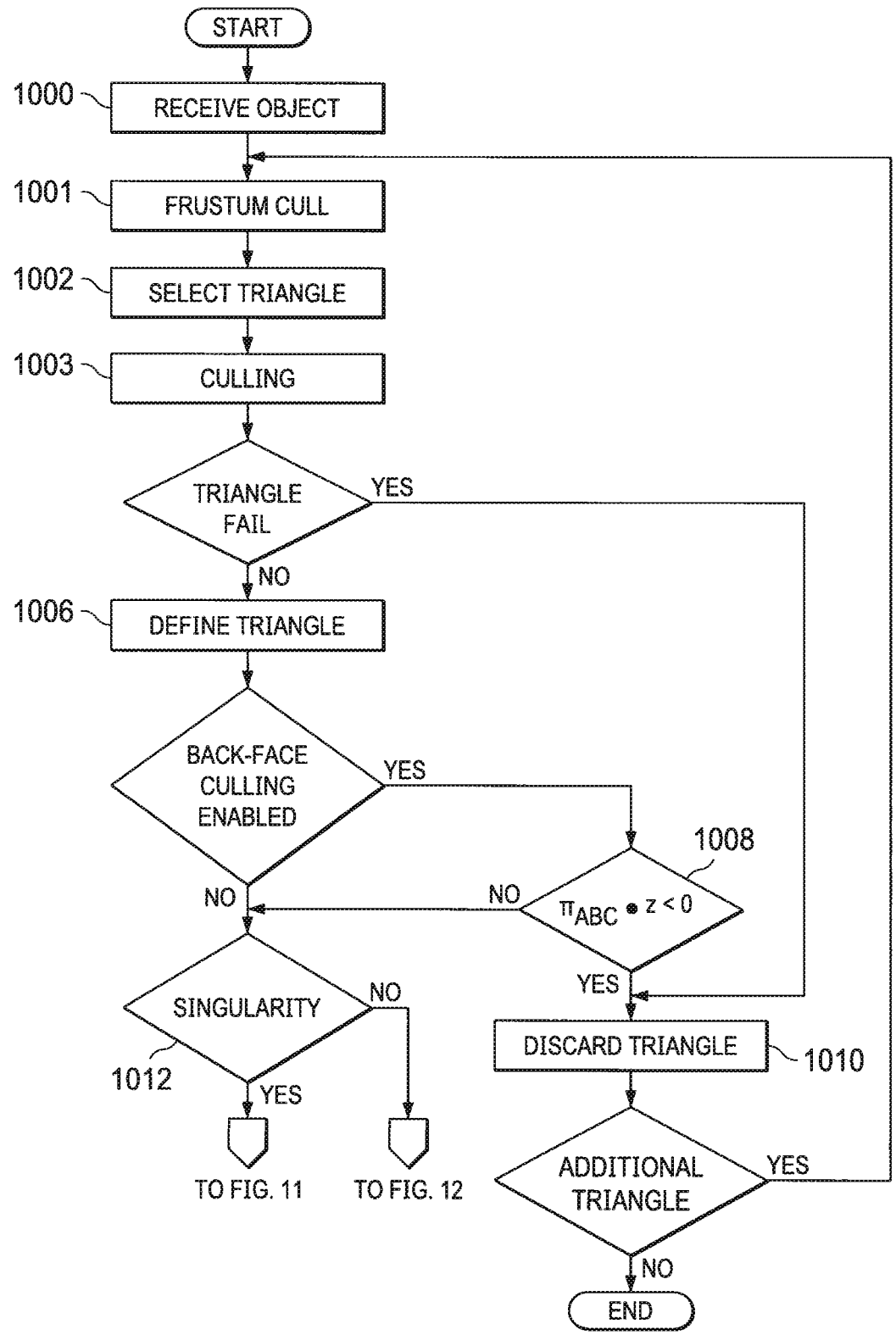
FIG. 10 is a flow chart illustrating a portion of one embodiment of an efficient triangle rasterization method.

MvPU control processor 720 can implement a buffer management engine to manage the render buffers. FIGS. 8A and 8B illustrate one embodiment of buffer management of render buffers 740, 742, 744 at different times. In FIG. 8A, t=x and in FIG. 8B, t=x+1. As illustrated, rendering commands can be fed into a first render buffer (e.g., render buffer 740), while the controller 700 dispatches rendering commands to the MvPUs from another list (e.g., render buffer 742). A third render buffer (e.g., render buffer 744) is provided for the case when rendering is complete from render buffer and the current render list is still being filled in render buffer 744. The third buffer would be the previous frame's content and represent the most recent complete draw command set for a scene. The MvPUs can render from this buffer without stalling for a complete 'next' frame.

Assume, for example, n=2, t=6 in FIG. 8A and t=7 in FIG. 8B. In FIG. 8A, rendering commands for rendering scene frame (6) are written to render buffer 742 while rendering commands for rendering scene frame (4) are dispatched from render buffer 740 to one or more MvPUs. Render buffer 744 stores rendering commands for scene frame (5). The rendering commands may include model transforms (M) for 3D models in the scene, a view volume and a view volume transform (V). In FIG. 8B, rendering commands for scene frame (7) are written to render buffer 740 while rendering commands for scene frame (5) are dispatched from render buffer 744 to one or more MvPUs. It can be noted that, in the transition between FIGS. 8A and 8B, render buffer 744 allows the MvPUs to begin rendering scene frame (5) without having to wait for the rendering commands for the current frame (e.g., scene frame (6)) to be completely buffered in render buffer 742.

Returning to FIG. 7, the synchronization task can listen for a signal from each MvPU indicating that it has completed rendering a scene frame. When the MvPU controller has received such a signal from each MvPU, it can send a signal to each MvPU to facilitate parallel display (projection) of rendered images as discussed above.

In some embodiments, MvPU controller 700 can receive a synchronization signal from each MvPU that a swap state has been reached. After a swap event, the MvPUs are then ready to render the next frame. This synchronization can be facilitated by the fact that the next frame should be in the render buffer of controller. Thus, when the synchronization task determines that all the MvPUs have reached the swap state, the synchronization task can signal the dispatch task to dispatch the next scene from the render buffers.

Turning now to some examples of rasterization and fragment processing in more detail, a multi-view rendering system can apply various techniques to render an image based on a viewpoint. According to some embodiments, rendering a hogel radiance image can involve projecting all points within a triangle onto the top of a hogel frustum (the far plane). Treating the Cartesian ($R^3$) representation of $\vec{x}_{eye}$ points as homogeneous coordinates in $\mathbb{P}^2$ allows points on both sides of the image plane to correctly project onto the top far plane. For points behind the display plane, the negative z-term provides the desired mirroring effect.

In FIG. 9A, for example, points 900 and 902 are projected on to the far plane in $\vec{x}_{eye}$ space as points 900' and 902' respectively. In FIG. 9B, illustrates projecting points and segments on to the far plane in $\vec{x}_{n\text{-}eye}$ space. For example, point 910 is projected as point 910', point 920 is projected as point 920', point 930 is projected as point 930', segment 914 is projected as segment 914', segment 924 is projected as segments 924' and segment 934 is projected as segments 934'

Two-sided rendering has additional complexity for triangles with vertices that span the z=0 plane. In these cases, the triangle does not occupy a tightest fit rectangle bounding the vertices in image space, but instead extends (infinitely) off the image sides. The triangle rasterization algorithm can take this into account.

FIGS. 10-13 illustrate one embodiment of a bowtie frustum rendering technique to rasterize triangles based on $\vec{x}_{n\text{-}eye}$ space. As one of ordinary skill in the art will appreciate, the calculations can be adjusted if the bowtie frustum used is not an ideal 90° frustum. To reduce the likelihood of error, operations can be performed with floating point numbers with division compliant with IEEE 754: pos/(+0)=+infinity, pos/(−0)=−infinity, etc.

At step 1000, the multi-view rendering system can receive a model which includes geometry, texture, lighting and a bounding volume. In particular, the rasterizer can receive $\vec{x}_{n\text{-}eye}$ vertex coordinates, for example, in clockwise order $[\vec{A},\vec{B},\vec{C}]$. According to some embodiments, frustum culling can be performed (step 1001). If the bounding volume of the object falls entirely outside of the frustum for the viewpoint, the object may be culled and the process can move on to the next object. If the object is not culled, a triangle can be selected from a triangle list for the object (step 1002) and the method may proceed to step 1003.

At step 1003, triangle culling can be performed in which the triangle is tested against one or more of the planes that make up the frustum. Triangles that fall entirely outside of the frustum or otherwise fail the culling tests can be discarded.

In one embodiment, triangles are tested against the top and bottom planes if a min-z and/or max-z is configured. Multi-view rendering system can discard a triangle if all its vertices are outside of the range. For a planar display, this culling may be performed for all viewpoints (e.g., for all hogels) at once because, in such a system, a vertex will have the same z coordinate in all hogel $\vec{x}_{n\text{-}eye}$ space coordinate systems. If a triangle is discarded, the method can move to the next triangle if any triangles remain.

At step 1006, the multi-view rendering system defines the triangle in $\mathbb{P}^3$ (standard homogenous 3D coordinates) as:

$$\pi_{ABC} = \begin{bmatrix} (\vec{A}-\vec{C}) \times (\vec{B}-\vec{C}) \\ -\vec{C}^T \cdot (\vec{A} \times \vec{B}) \end{bmatrix}$$

If back-face culling is enabled, the multi-view rendering system, at step 1008, can perform a single test for back-facing on both sides of the image plane to cull a triangle not facing the viewer. According to one embodiment, if $\pi_{ABC} \cdot z<0$, that is if $$\pi_{ABC} \cdot \begin{bmatrix} 0 \\ 0 \\ 1 \\ 0 \end{bmatrix} < 0),$$

the multi-view rendering system can discard the triangle (step 1010). If a triangle is discarded, the method can move the next triangle if any triangles remain.

At step 1012, the multi-view rendering system tests the triangle plane for singularity (e.g., intersection of triangle plane with (0,0,0) in the viewpoint-specific eye space being evaluated). The triangle is singular if $\pi_{ABC} \cdot w=0$, where w is the fourth component of the four vector representing the plane. If the triangle is singular, only its edges are visible, with the exception of the triangle point at the hogel origin (if it is within the triangle) and the method proceeds to step 1102 of FIG. 11. If the triangle does not present a singularity, the method proceeds to step 1202 of FIG. 12.

Figure 11:
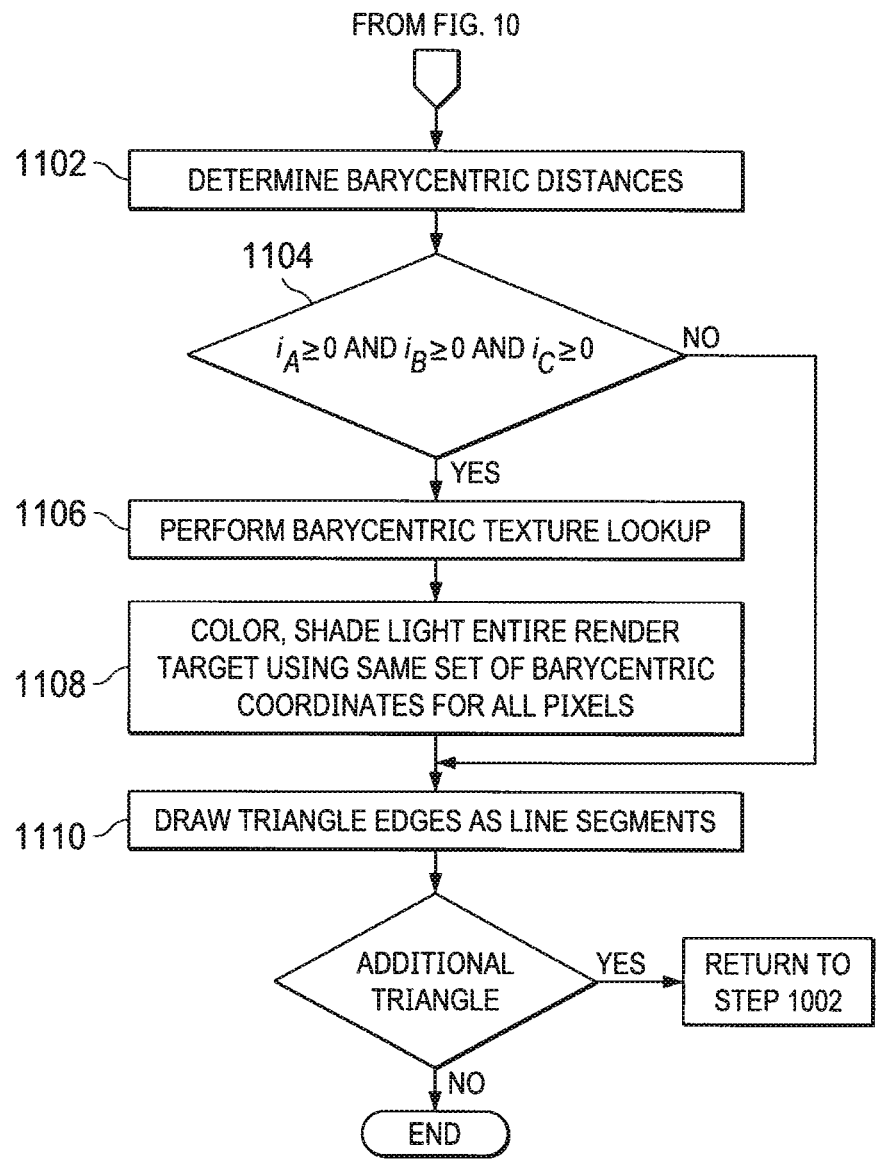
FIG. 11 is a flow chart illustrating one embodiment of rendering pixel data for a triangle when it is determined that the triangle plane tests positive for a singularity.

FIG. 11 is a flow chart illustrating one embodiment of rendering pixel data for a triangle when it is determined that the triangle plane tests positive for a singularity.

At step 1102, the barycentric coordinates of the triangles origin are determined. More particularly, at step 1102, the barycentric distances are determined as follows:

$$\vec{b}_C = \left(\begin{bmatrix} 0 \\ 0 \\ 0 \end{bmatrix} - \vec{A}\right) \times (\vec{B} - \vec{A})$$

$$\vec{b}_A = \left(\begin{bmatrix} 0 \\ 0 \\ 0 \end{bmatrix} - \vec{B}\right) \times (\vec{C} - \vec{B})$$

$$\vec{b}_B = \left(\begin{bmatrix} 0 \\ 0 \\ 0 \end{bmatrix} - \vec{C}\right) \times (\vec{A} - \vec{C})$$

-continued $$i_A = \pi_{ABC} \cdot \vec{b}_A$$

$$i_B = \pi_{ABC} \cdot \vec{b}_B$$

$$i_C = \pi_{ABC} \cdot \vec{b}_C$$

The i coordinates indicate which side of an opposing edge the point is on (e.g., $i_A$ corresponds to edge CB edge). In order to be within the triangle, a point has to be on the positive side of all three edges. If all $i_A \geq 0$, $i_B \geq 0$, $i_C \geq 0$ (step 1104), the triangle contains the origin and the method proceeds to step 1106.

At step 1106, a barycentric texture lookup is performed:

$$N = \|\vec{b}_A\| + \|\vec{b}_B\| + \|\vec{b}_C\|$$

$$t = \frac{\|\vec{b}_A\|}{N}$$

$$u = \frac{\|\vec{b}_B\|}{N}$$

$$v = \frac{\|\vec{b}_C\|}{N}$$

$$tcoord = t\begin{bmatrix}r_A \\ c_A\end{bmatrix} + u\begin{bmatrix}r_B \\ c_B\end{bmatrix} + v\begin{bmatrix}r_C \\ c_C\end{bmatrix}$$

The tcoord are used to lookup the color indicated for the coordinate in the texture data provided by the host application. It can be noted that the barycentric coordinate can be calculated once for the triangle for the entire viewport (or other render target) and used for texture lookup, vector normal calculations and shading calculation. At step 1108, the rasterizer can use the barycentric coordinates to color the entire viewport (or other render target) for pixel depth z=0.

Shading can be performed according to various techniques, including but not limited to the Phong Reflection Model, described in Phong, Bui Tuong "Illumination for Computer Generated Graphics," Communications of the ACM, Vol. 18, No. 6, Association of Computing Machinery, Inc. (June 1975). The Phong algorithm is a simple shading model that describes the manner in which light reflects off a surface. The Phong model uses an ambient, diffuse and specular description of both the surface material and source light to accumulate a pixel color value for a fragment. The specular component requires knowledge of the light position (in camera space) and the surface normal for each fragment.

It can be noted that if a normalized eye space $\vec{x}_{n\text{-}eye}$ is used, the lighting angle can also be adjusted to account for changes in angles due to the transform to the normalized eye space.

At step 1110, the triangle edges are drawn as line segments (that is, the pixel data for the line segments is rendered). After drawing the triangle edges, the singular triangle is completed and the method can move to the next triangle.

Figure 12:
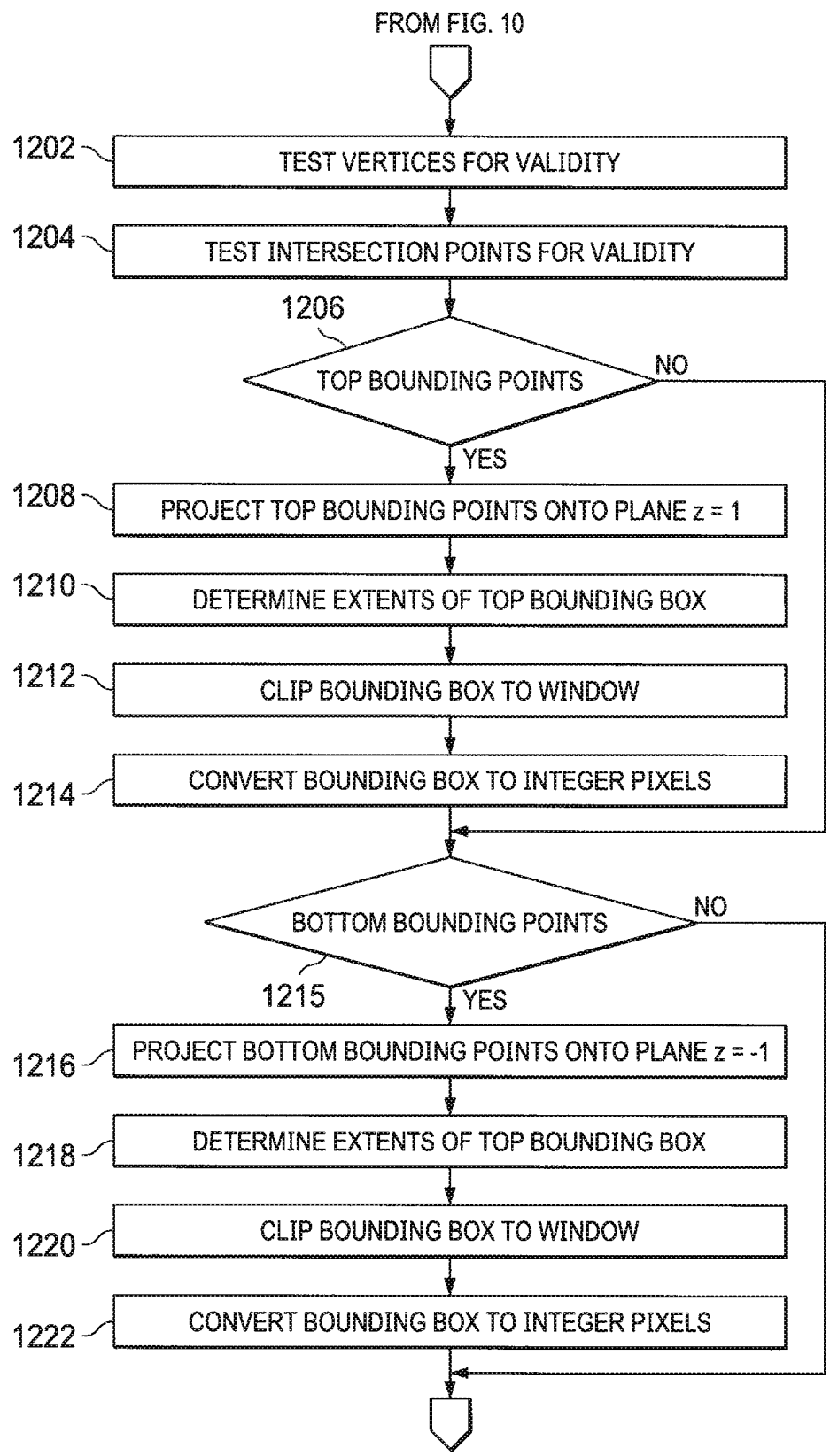
FIG. 12 is a flow chart illustrating one embodiment of rendering a non-singular triangle.

FIG. 12 is a flow chart illustrating one embodiment of rendering a non-singular triangle. According to the embodiment of FIG. 12, the top (z≥0) bounding box and bottom (z≤0) bounding boxes are determined. One of these may be empty if all the vertices are on same side of image plane. Visibility testing can also be achieved (both boxes will be empty if the triangle falls outside the hogel field of view).

Multiple potential bounding points are tested for validity. For example, according to one embodiment, at least fifteen bounding points are tested.

At step 1202, three vertices are tested for validity: a vertex is valid if it projects into (−1:1,−1:1) range on z=1 plane . . . i.e.

$$\frac{|v.x|}{v.z} \leq 1 \quad \& \quad \frac{|v.y|}{v.z} \leq 1$$

At step 1204, multiple intersection points are tested. For example, intersections points can be defined for the intersection of each edge (AB,BC,CA) with each frustum plane $$\left(P_T = \begin{bmatrix}0\\1\\1\end{bmatrix}, P_L = \begin{bmatrix}-1\\0\\1\end{bmatrix}, P_B = \begin{bmatrix}0\\-1\\1\end{bmatrix}, P_R = \begin{bmatrix}1\\0\\1\end{bmatrix}\right)$$

For each of the above combinations, and using labels $P_F$ for frustum plane and $p_1$, $p_2$ for edge vertices, the multi-view rendering system can determine the scalar parameter of intercept point for the edge vector formula:

$$k_{int} = \frac{-P_F^T \cdot p_1}{P_F^T \cdot (p_2 - p_1)}$$

The multi-view rendering system then determines a potential bounding point as:

$$p_{int} = p_1 + k_{int}(p_2 - p_1)$$

The bound point is valid if $0 < k_{int} < 1$ (non-inclusive interval because values 0 and 1 indicate intersection at vertex).

A top bounding box is built from the top bounding points where the top bounding points are all bounding points that are valid, and satisfy p·z≥0. If a top bounding point has p·z=0, its z value can be set to +0 before proceeding. If there are no top bounding points, as determined at step 1206, the top bounding box is empty and the method can proceed to determining the bottom frustum bounding box.

If it is determined that there are top bounding points, the top bounding points are projected onto the plane z=1 (step 1208):

$$b.x = \frac{p.x}{p.z}$$

$$b.y = \frac{p.y}{p.z}$$

At step 1210, the extents of the top bounding box are determined as follows:

min $x$=min $b \cdot x, b \in$ top bounds max $x$=max $b \cdot x, b \in$ top bounds min $y$=min $b \cdot y, b \in$ top bounds max $y$=max $b \cdot x, b \in$ top bounds The bounding box can then be clipped to a window (−1 . . . 1) (step 1212):

min $x$=max(min $x$,−1)

max $x$=min(max $x$,1)

min $y$=max(min $y$,−1)

max $x$=min(max $y$,1)

At step 1214, the bounding box is converted to integer pixel coordinates for a viewport or other render target window width nC and height nR:

min $c$=⌊0.5(min $x$)nC+0.5nC⌋ max $c$=⌊0.5(max $x$)nC+0.5nC⌋ min $r$=⌊0.5(min $y$)nR+0.5nR⌋ max $r$=⌊0.5(min $y$)nR+0.5nR⌋

Figure 13:
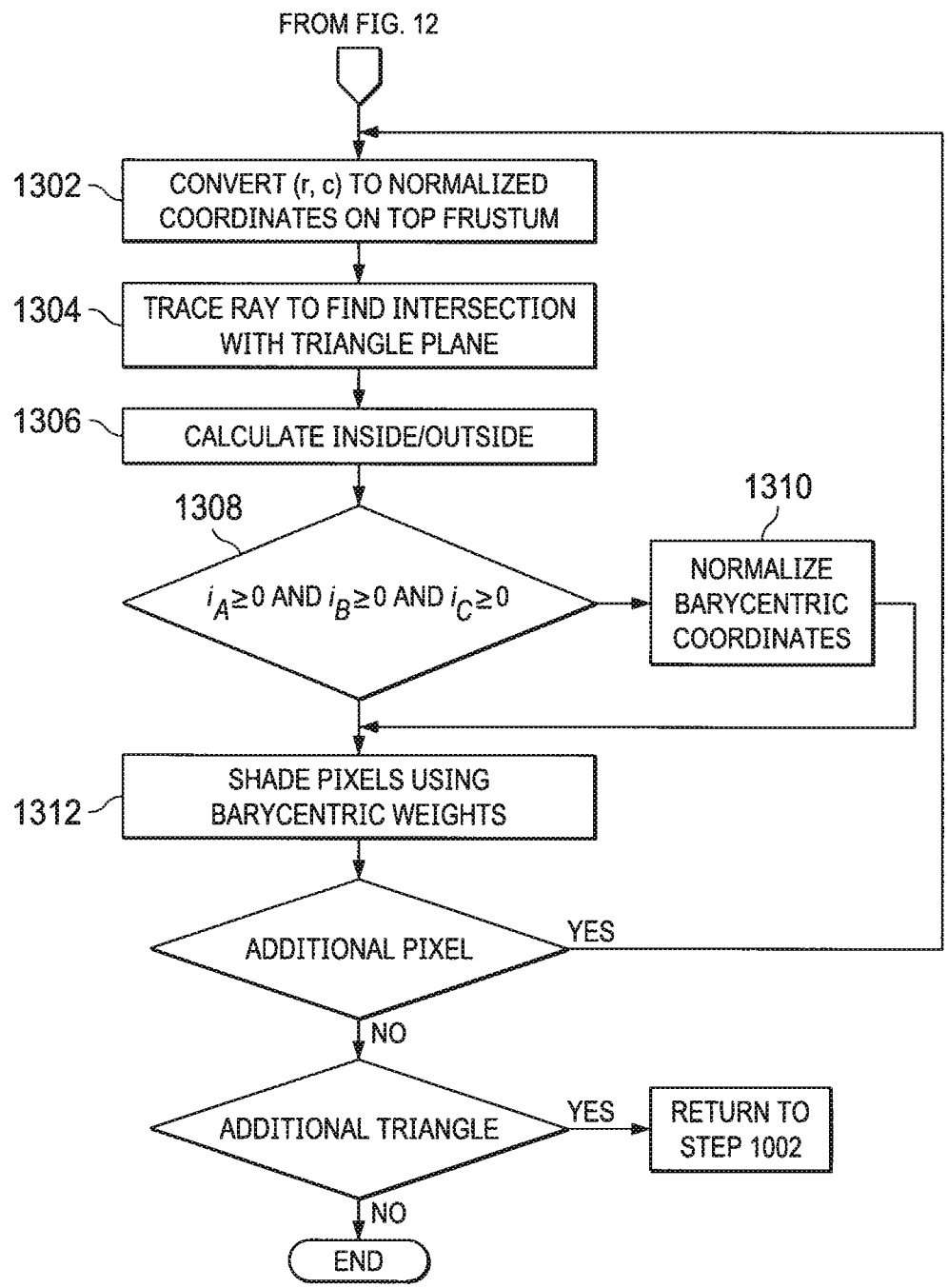
FIG. 13 is a flow chart illustrating one embodiment of a method for iterating over the pixels in bounding boxes of a bowtie frustum.

The method can then proceed to constructing the bottom frustum bounding box with the bottom bounding points where the bottom bounding points are all bounding points that are valid, and satisfy p·z≤0. If a bottom bounding point has p·z=0, its z value can be set to −0 before proceeding. If there are no bottom bounding points, as determined at 1215, the bottom bounding box is empty, and the method proceeds to pixel iteration (FIG. 13).

If it is determined that there are bottom bounding points, the bottom bounding points are projected onto the plane z=1 (step 1216):

$$b.x = \frac{p.x}{p.z}$$

$$b.y = \frac{p.y}{p.z}$$

At step 1218, the extents of the bounding box are determined as follows:

min $x$=min $b·x, b∈$top bounds max $x$=max $b·x, b∈$top bounds min $y$=min $b·y, b∈$top bounds max $y$=max $b·x, b∈$top bounds The bounding box can then be clipped to a window (−1 . . . 1) (step 1220):

min $x$=max(min $x$,−1)

max $x$=min(max $x$,1)

min $y$=max(min $y$,−1)

max $x$=min(max $y$,1)

At step 1222, the bottom bounding box is converted to integer pixel coordinates for window width nC and height nR:

min $c$=⌊0.5(min $x$)nC+0.5nC⌋ max $c$=⌊0.5(max $x$)nC+0.5nC⌋ min $r$=⌊0.5(min $y$)nR+0.5nR⌋ max $r$=⌊0.5(min $y$)nR+0.5nR⌋

The multi-view rendering system can iterate over all (r,c) pixels within each bounding box (top and bottom). FIG. 13 is a flow chart illustrating one embodiment of a method for iterating over the pixels in the bounding boxes.

At step 1302, the multi-view rendering system can convert (r,c) to normalized pixel coordinates on the top frustum $$\begin{bmatrix} t_x \\ t_y \\ t_z \end{bmatrix} = \begin{bmatrix} \frac{c - w_c}{NC} \\ \frac{r - w_r}{nR} \\ 1 \end{bmatrix}$$

for a draw window centered at $(w_r, w_c)$ and size nC×nR.

At step 1304, a ray trace from $$\begin{bmatrix} t_x \\ t_y \\ t_z \end{bmatrix} \text{ to } \begin{bmatrix} 0 \\ 0 \\ 0 \end{bmatrix}$$

is performed find intersection with the triangle plane:

$$p_z = \frac{-\pi_{ABC}[3]}{\pi_{ABC}[0]m_x + \pi_{ABC}[1]m_y + \pi_{ABC}[2]}, \vec{p} = \begin{bmatrix} p_x \\ p_y \\ p_z \end{bmatrix} = \begin{bmatrix} p_z t_x \\ p_z t_y \\ p_z \end{bmatrix}$$

which may also be expressed:

$$p_z = \frac{-\pi_{ABC} \cdot w}{\pi_{ABC}.x \cdot t_x + \pi_{ABC}.y \cdot t_y + \pi_{ABC}.z}$$

At step 1306, the system calculates inside/outside:

$\vec{b}_C = (\vec{p} - \vec{A}) \times (\vec{B} - \vec{A})$ $\vec{b}_A = (\vec{p} - \vec{B}) \times (\vec{C} - \vec{B})$ $\vec{b}_B = (\vec{p} - \vec{C}) \times (\vec{A} - \vec{C})$ $i_A = \pi_{ABC} \cdot \vec{b}_A$ $i_B = \pi_{ABC} \cdot \vec{b}_B$ $i_C = \pi_{ABC} \cdot \vec{b}_C$ At step 1308, the multi-view rendering system determines if $i_A \geq 0$, $i_B \geq 0$, $i_C \geq 0$, and, if so, normalizes the barycentric coordinates (step 1310):

$$N = \|\vec{b}_A\| + \|\vec{b}_B\| + \|\vec{b}_C\|$$

$$t = \frac{\|\vec{b}_A\|}{N}$$

$$u = \frac{\|\vec{b}_B\|}{N}$$

$$v = \frac{\|\vec{b_C}\|}{N}$$

At step 1310, the pixel can be shaded using the barycentric weights t, u, v:

$$f(r, c) = tf_A + uf_B + vf_C$$

$$tcoord = t\begin{bmatrix} r_A \\ c_A \end{bmatrix} + u\begin{bmatrix} r_B \\ c_B \end{bmatrix} + v\begin{bmatrix} r_C \\ c_C \end{bmatrix}$$

The tcoord are used to lookup the color indicated for the coordinate in the texture data provided by the host application. Shading can be performed according to various techniques, including but not limited to, the Phong Reflection Model.

If a normalized eye space $\vec{x}_{n\text{-}eye}$ is used, the lighting angle can also be adjusted to account for changes in angles due to the transform to the normalized eye space.

The steps of FIG. 13 can be repeated for each (r,c) pixel within each bounding box (top and bottom).

It can be noted that the embodiments of FIG. 10-13 allow the multi-view rendering system to render multiple sides of a hogel image in a single pass of the geometry using a single bowtie frustum and without having to employ conjugate cameras for a single position. The methods of FIGS. 10-13 may be performed by, for example a rasterizer and fragment processor of a multi-view rendering system 101, 201, 300, 400 or other system. The steps are provided by way of example and may be performed in other orders. Moreover, steps may be repeated or omitted or additional steps added.

Figure 14:
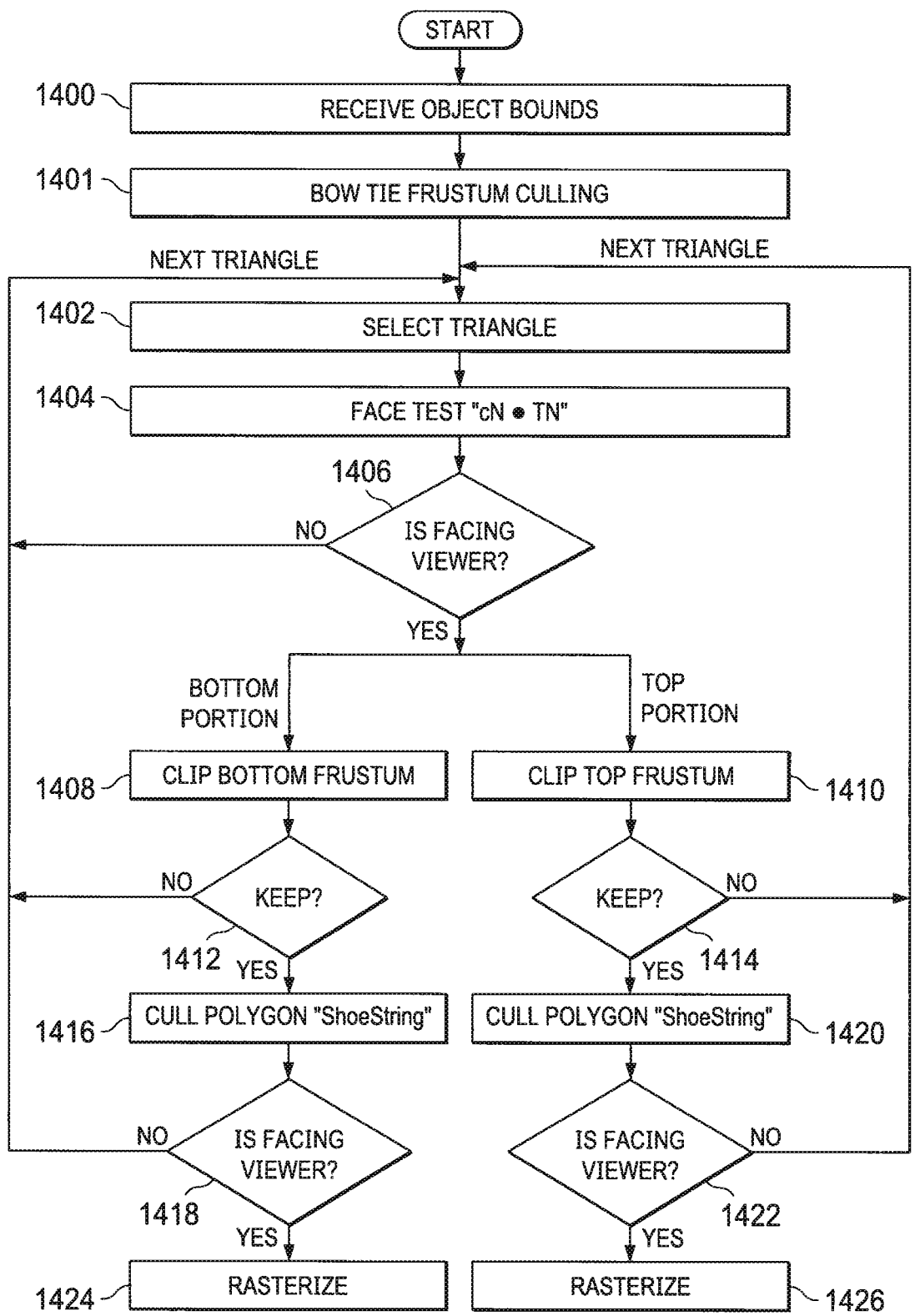
FIG. 14 is a flow chart illustrating another embodiment of a method for rendering using a bowtie frustum.
Figure 15:
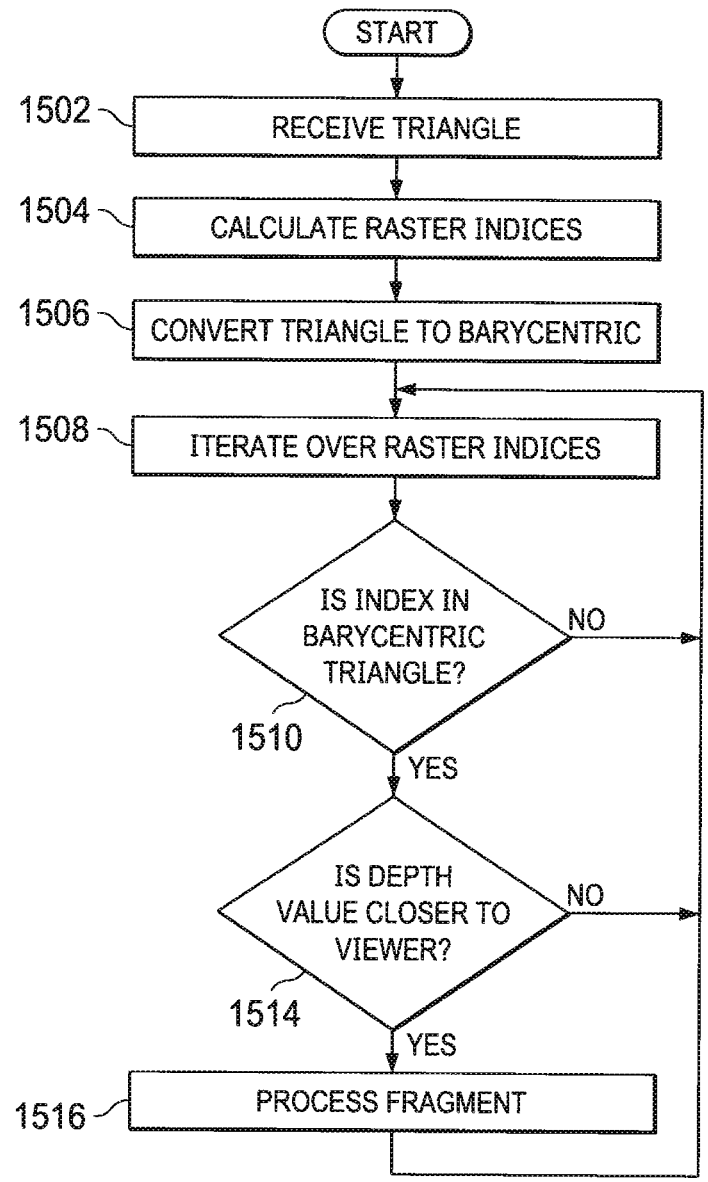
FIG. 15 is a flow chart illustrating another embodiment of rasterization.

FIG. 14 and FIG. 15 are flow charts illustrating another method of rendering an image. The steps of FIG. 14 and FIG. 15 may be performed by, for example, a rasterizer and fragment processor of a multi-view rendering system 101, 201, 300, 400 or other system.

At step 1400 an object is received. At step 1401 frustum culling is performed. In particular, if the bounding volume of the object falls entirely outside of the bowtie frustum, the object can be discarded and the system can move to the next object or take another action.

If the object is not culled, a triangle of the object can be selected from a list of triangles (step 1402). At step 1404, a face test is performed to determine if the triangle is facing the virtual viewer. The dot product of the camera normal vector and the triangle normal vector is determined, where the triangle normal vector is calculated to determine if the triangle faces the viewer. If the dot product is less than or equal to zero, the virtual viewer and triangle are likely facing each other as determined at step 1406.

At step 1408, the triangle is clipped to the bottom half of the bowtie frustum (portion below the image plane) (step 1408) and clipped to the top portion of the bowtie frustum (portion above the image plane) (step 1410). In other words, the triangle is clipped at the intersection of the triangle with the frustum with the portions of the triangle that fall outside of the frustum being discarded. Note that if a triangle does not fall within either portion of the bowtie frustum it can be discarded (steps 1412, 1414). The method does not move to the next triangle at steps 1412, 1414, however, unless there is no portion of the triangle in the bowtie frustum.

At step 1416, another viewer facing test is performed on the triangle (or portion thereof) in the bottom portion of the frustum. Any suitable culling algorithm may be used to cull polygons not facing the viewer. For example, shoestring culling may be used. If the triangle (or portion thereof) is not facing the viewer based on the culling as determined at 1418, the triangle (or portion thereof) can be removed. Similar steps can be applied to the top portion of the bowtie frustum (e.g., steps 1420 and 1422). It can be noted that the method does not move to the next triangle at steps 1418, 1422 if there is any portion of the triangle facing the viewer in either the top portion of the frustum or the bottom portion of the frustum.

At step 1424, 1426, the triangle can be rasterized. According to one embodiment, the bottom portion of the frustum is rasterized first. When the bottom and top portions of the frustum have been rasterized for the triangle, a new triangle can be selected from the triangle list.

FIG. 15 is a flow chart illustrating one embodiment of rasterization. At step 1502, the triangle is received. At step 1504 the raster indices are calculated. That is, the triangle is projected onto the viewport or other render target window. At step 1506, the triangle is converted to barycentric coordinates. The system iterates over the raster indices (represented at step 1508) and determines if each index is in the barycentric triangle (step 1510). If an index is not in the barycentric triangle, the next index is tested. If an index is in barycentric triangle, the depth value for the portion of the triangle that projects to that index is compared to the existing depth value for the index (step 1514). If the depth value corresponds to the triangle being further away from the viewer than the existing depth valve for the index, the next index is selected. If the depth value corresponds to the triangle being closer to the viewer than the previous value, the fragment is processed (step 1516). For example, the pixel data is rendered for that index using textures, lighting etc. The method of FIG. 15, thus preserves, for a given pixel, the pixel data representing the geometry that will be closest to a viewer when projected.

The steps of FIG. 14-15 are provided by way of example and may be performed in other orders. Moreover, steps may be repeated or omitted or additional steps added.

Figure 16:
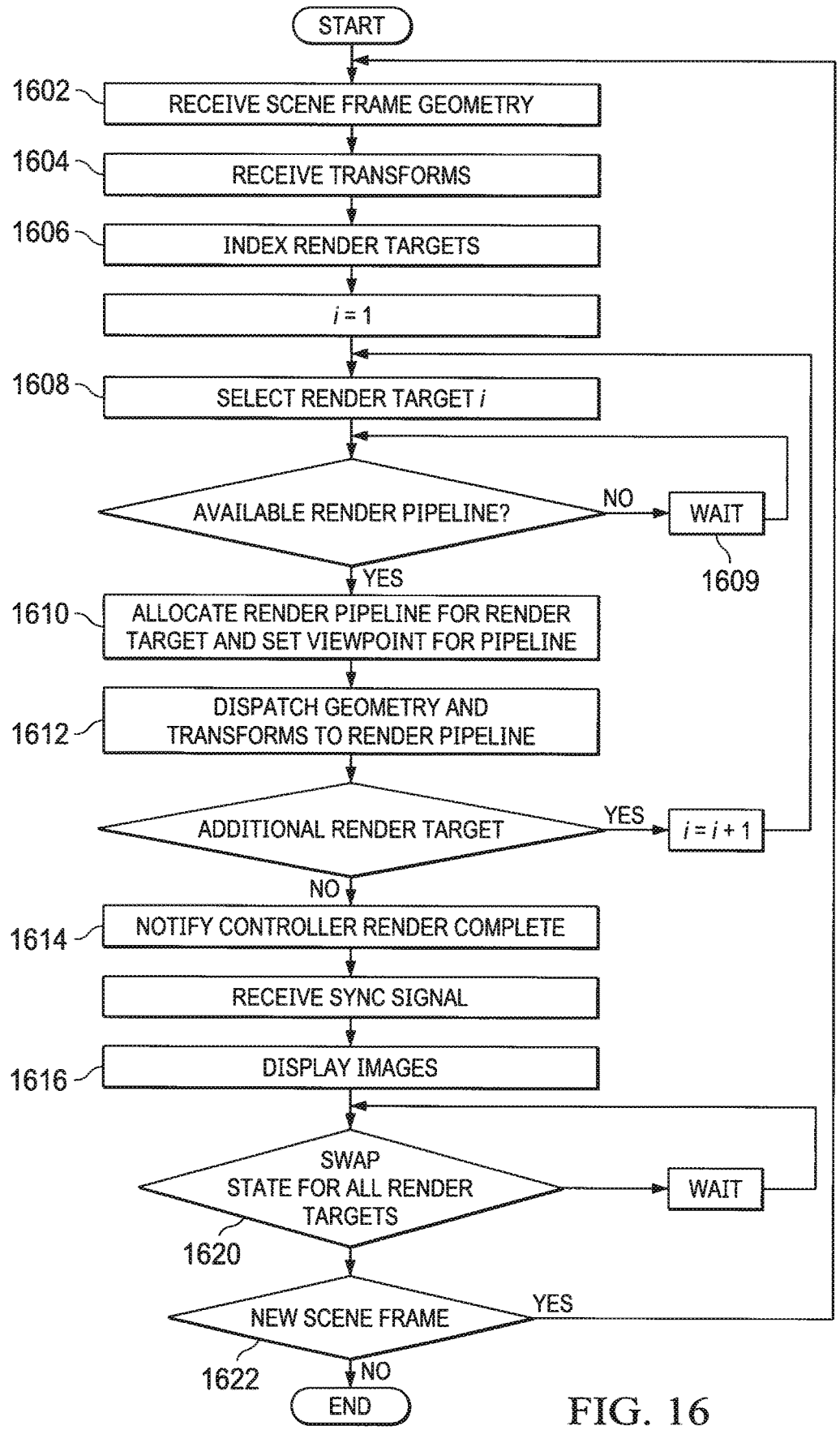
FIG. 16 is a flow chart illustrating one embodiment of managing parallel rendering pipelines.

FIG. 16 is a flow chart illustrating one embodiment of managing parallel rendering pipelines at, for example, an MvPU, such as MvPU 150, 250. At step 1602 the MvPU receives scene geometry and, at step, 1604 receives a render list for a scene frame to render. The render list may specify one or more transforms, such as one or more of an M matrix, a view volume, a V matrix or other transforms. At step 1606, the MvPU indexes through the geometry of the scene and the array of render targets (e.g., hogels or other defined target to which the MvPU renders images).

At step 1608, the MvPU selects a render target and determines if a render pipeline is available. If a render pipeline is not available, the MvPU can wait for the next available pipeline (step 1609). If a pipeline is available, the MvPU allocates an available render pipeline to the render target and sets the viewpoint corresponding to the selected render target (e.g., the view specific transform) as the viewpoint for the pipeline (step 1610) and dispatches geometry and the appropriate transforms (step 1612). The MvPU can repeat this process until all the render targets have been serviced.

When all the pipelines have completed render operations, the MvPU can send a render complete signal to the controller (step 1614). When the MvPU controller has received a render complete message from each MvPU in a display system, the MvPU controller can send a synchronization signal to synchronize display the multiple images. At step 1616, the MvPU may write the data to a viewport, signal photonics that image data is available or take other action to facilitate display.

According to one embodiment, the MvPU can determine if a swap state has been reached for all render targets for which the MvPU is responsible (e.g., a state where the back and front buffers can swap) (step 1620). When a swap state has been reached for all render targets, the MvPU can notify the MvPU controller that it is ready to process the next scene frame. The process can repeat for the next scene frame received from the MvPU controller (step 1622).

The steps of FIG. 16 are provided by way of example and may be performed in other orders. Moreover, steps may be repeated or omitted or additional steps added.

According to some embodiments of the present invention, the burden of multi-view rendering rests within the MvPU system. The MvPU dependence on a host CPU is minimized to allow independent operation from the host system/application and allow placement of MvPUs close to the photonics. A central MvPU system controller may manage synchronization and render dispatch for the MvPU system.

According to one embodiment, each MvPU may have an independent local cache of geometry/textures. The content of the cache can be managed by the MvPU system controller.

An MvPU can render multiple views at a time. In one embodiment, there exists a render pipeline per view. In another embodiment, there is a queue of views that are dispatched to multiple render pipelines.

An MvPU can render a subset of the global radiance image, as such the MvPU can maintain an assignment/allocation of hogel positions and orientations (transforms) in view volume space.

Pre-caching the geometry and restricting cache updates to happen outside of the clear(begin)/finish(end) control blocks, can allow the MvPU to render at rates independent from the host. Updates to the cache can be queued and scheduled by the MvPU controller for after a finish/end command.

Triple buffering the draw lists can allow the MvPUs to begin rendering from the latest complete render list regardless of the render state of the host system/application.

A bowtie frustum projection can be rendered in one pass by allowing the near plane value of the traditional perspective projection matrix to be behind the camera (negative) and account for the fact that a triangle may reside in one or both frustums.

Improved cache locality/management can be facilitated by rendering all hogel images against the cached geometry (hogel priority rendering) rather than rendering all the geometry against each hogel (geometry priority rendering).

In some embodiments, viewpoint specific transforms, render target definitions or correction data may be persistently stored by an MvPU controller that can distribute the viewpoint specific transforms, render target definitions or correction data to the MvPUs (e.g., a system boot up). In other embodiments, viewpoint specific transforms, render target definitions or correction data may be persistently stored at the MvPUs.

Furthermore, various techniques described herein may be applied in a variety of system architectures.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

At least portions of the functionalities or processes described herein can be implemented in suitable computer-executable instructions. The computer-executable instructions may reside on a computer readable medium, hardware circuitry or the like, or any combination thereof. The computer-executable instructions may be stored as software code components or modules on one or more computer readable media.

Within this disclosure, the term "computer readable medium" is not limited to ROM, RAM, and HD and can include any type of data storage medium that can be read by a processor (such as non-volatile memories, volatile memories, DASD arrays, magnetic tapes, floppy diskettes, hard drives, optical storage devices, etc. or any other appropriate computer-readable medium).

In one embodiment, the computer-executable instructions may include lines of compiled code according a selected programming language. Any suitable programming language can be used to implement the routines, methods or programs of embodiments of the invention described herein. Different programming techniques can be employed such as procedural or object oriented.

Particular routines can execute on a single processor or multiple processors. For example, various functions of the disclosed embodiments may be distributed. Communications between systems implementing embodiments can be accomplished using any electronic, optical, radio frequency signals, or other suitable methods and tools of communication in compliance with various protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

Although the present invention has been described in detail, it should be understood that various changes, substitutions and alterations can be made hereto without departing from the spirit and scope of the invention as defined by the appended claims.

What is claimed is:

1. A system comprising:
a multi-view graphics processing unit, the multi-view graphics processing unit comprising:
a multi-view graphics processing unit memory storing a plurality of viewpoints; and
a multi-view graphics processing unit processor including a plurality of parallel rendering pipelines, the multi-view graphics processing unit processor configured to:
receive scene data and a request to render a scene, the scene data including data for a plurality of triangles;
load the plurality of viewpoints and process the scene data using the plurality of parallel rendering pipelines to render multiple hogel views of the scene in parallel based on the plurality of viewpoints, the plurality of parallel rendering pipelines configured to render, in parallel, image data for the multiple hogel views to a set of render targets, each render target in the set of render targets corresponding to a different hogel,
wherein processing the scene data using the plurality of parallel rendering pipelines comprises rasterizing a same triangle from the plurality of triangles in parallel for each of the multiple hogel views prior to moving to a next triangle from the plurality of triangles.

2. The system of claim 1, wherein:
the plurality of viewpoints comprises a plurality of viewpoint-specific transforms;
the scene data includes geometry for a 3D model in a model space;
the multi-view graphics processing unit is configured to receive:
a view volume definition defining a view volume to render;
a view volume transform that expresses a relationship between the view volume and a world space;
a model transform that expresses a relationship between the model space and the world space;
each rendering pipeline of the plurality of parallel rendering pipelines is configured to:
apply the model transform to transform the geometry for the 3D model to the world space;
apply the view volume transform to transform the geometry for the 3D model from the world space to a view volume space in which the view volume has a display plane with a display plane center corresponding to an optical center of a physical display that includes a plurality of projectors;

apply a respective viewpoint-specific transform from the plurality of viewpoint-specific transforms to transform the geometry for the 3D model to a respective viewpoint-specific eye space having an image plane with an image plane center corresponding to an optical center of a respective projector from the plurality of projectors of the physical display;

define a bowtie frustum having a first side above the image plane of the respective viewpoint-specific eye space and a second side below the image plane of the respective viewpoint-specific eye space; and render both sides of the bowtie frustum in a single pass.

3. The system of claim 1, wherein the plurality of parallel rendering pipelines render directly into a set of display buffers for photonics of an optical display.

4. The system of claim 1, wherein the multi-view graphics processing unit is configured to render the image data to a local buffer and transfer the image data from the local buffer to a display buffer.

5. The system of claim 1, wherein the multi-view graphics processing unit is configured to assign a different one of the plurality of viewpoints and a different one of render targets to each of the plurality of parallel rendering pipelines.

6. The system of claim 5, wherein each rendering pipeline of the plurality of parallel rendering pipelines is configured to transform scene geometry from model space to a viewpoint specific eye space corresponding to the different one of the plurality of viewpoints assigned to that render pipeline.

7. The system of claim 1, comprising a plurality of multi-view graphics processing units and a multi-view graphics processing unit controller to dispatch geometry data and render lists to the plurality of multi-view graphics processing units, the plurality of multi-view graphics processing units including the multi-view graphics processing unit.

8. The system of claim 7, further comprising a geometry cache and a plurality of render list buffers.

9. The system of claim 7, wherein the multi-view graphics processing unit controller is configured to triple buffer render lists for dispatch to the multi-view graphics processing unit.

10. The system of claim 7, wherein the multi-view graphics processing unit controller is configured to generate a synchronization signal to the multi-view graphics processing units to synchronize display of the multiple hogel views.

11. The system of claim 7, wherein the multi-view graphics processing unit controller is configured to halt dispatch of a next scene frame to the multi-view graphics processing unit until a synchronization signal is received from the multi-view graphics processing unit.

12. The system of claim 1, wherein each rendering pipeline of the plurality of parallel rendering pipelines is configured to:

define a bowtie frustum having an origin at an image plane;

render multiple sides of the bowtie frustum in a single pass without duplicating geometric shapes that pass through the image plane.

13. A method comprising:

receiving, at a multi-view graphics processing unit, a request to render a scene, the scene comprising 3D geometry data, the multi-view graphics processing unit storing a plurality of viewpoints and comprising a multi-view graphics processing unit processor that includes a plurality of parallel rendering pipelines;

based on the request to render the view of the scene, the multi-view graphics processing unit processor processing the 3D geometry data using the plurality of parallel rendering pipelines to render multiple hogel views of the scene in parallel, each rendering pipeline of the plurality of parallel rendering pipelines assigned a different viewpoint from the plurality of viewpoints and configured to render a hogel view based on the viewpoint assigned to that pipeline;

rendering in parallel, by the plurality of parallel rendering pipelines, image data for the multiple hogel views to a set of render targets, each render target in the set of render targets corresponding to a different hogel, wherein the 3D geometry data includes data for a plurality of triangles and rendering by the plurality of parallel rendering pipelines comprises rasterizing a same triangle from the plurality of triangles in parallel for each of the multiple hogel views prior to moving to a next triangle from the plurality of triangles.

14. The method of claim 13, further comprising the multi-view graphics processing unit:

receiving a model transform expressing a relationship between a model space and a world space;

receiving a view volume definition defining a view volume to render; and receiving a view volume transform that expresses a relationship between the view volume and the world space;

wherein processing the geometry data using the plurality of parallel rendering pipelines to render the multiple hogel views of the scene in parallel comprises each rendering pipeline of the plurality of parallel rendering pipelines:

applying the model transform to transform the 3D geometry data from the model space to the world space;

applying the view volume transform to transform the 3D geometry data from the world space to a view volume space in which the view volume has a display plane with a display plane center corresponding to an optical center of a physical display;

applying a respective viewpoint-specific transform to transform the 3D geometry data to a respective viewpoint-specific eye space having an image plane with an image plane center corresponding to an optical center of a respective projector of the physical display;

defining a bowtie frustum having a first side above the image plane of the respective viewpoint-specific eye space and a second side below the image plane of the respective viewpoint-specific eye space; and rendering both sides of the bowtie frustum in a single pass.

15. The method of claim 13, further comprising the multi-view graphics processing unit assigning a different one of the plurality of viewpoints and a different one of the set of render targets to each of the plurality of parallel rendering pipelines.

16. The method of claim 13, further comprising, performing in each of the plurality of parallel rendering pipelines, a model space to viewpoint specific eye space transform on a set of geometry data using the viewpoint assigned to that rendering pipeline.

17. The method of claim 15, further comprising dispatching geometry data and render lists, by a multi-view graphics processing unit controller, to the multi-view graphics processing unit.

18. The method of claim 17, further comprising caching vertices and texture at the multi-view graphics processing unit.

19. The method of claim 17, further comprising triple buffering render lists at the multi-view graphics processing unit controller for dispatch to the multi-view graphics processing unit.

20. The method of claim 19, further comprising determining by the multi-view graphics processing unit that a set of buffers are in a swap state and, based on the determination, sending a synchronization signal to the multi-view graphics processing unit controller.

21. The method of claim 17, further comprising halting dispatching by the multi-view graphics processing unit controller of a next scene frame to the multi-view graphics processing unit until a synchronization signal is received from each multi-view graphics processing unit coupled multi-view processing unit controller.

22. The method of claim 15, wherein processing the geometry data using the plurality of parallel rendering pipelines to render the multiple hogel views of the scene in parallel further comprises:
   defining a bowtie frustum having an origin at an image plane;
   rendering multiple sides of the bowtie frustum in a single pass without duplicating geometric shapes that pass through the image plane.

* * * * *